(12) United States Patent
Dolinar et al.

(10) Patent No.: US 11,261,571 B2
(45) Date of Patent: Mar. 1, 2022

(54) ROADWAY MAINTENANCE STRIPING CONTROL SYSTEM

(71) Applicant: LimnTech LLC, Souderton, PA (US)

(72) Inventors: Douglas D. Dolinar, Doylestown, PA (US); William R. Haller, Bethlehem, PA (US)

(73) Assignee: LIMNTECH LLC, Souderton, PA (US)

( * ) Notice: Subject to any disclaimer, the term of this patent is extended or adjusted under 35 U.S.C. 154(b) by 325 days.

(21) Appl. No.: 16/419,889

(22) Filed: May 22, 2019

(65) Prior Publication Data

US 2019/0271123 A1    Sep. 5, 2019

Related U.S. Application Data

(60) Division of application No. 15/117,952, filed as application No. PCT/US2015/017034 on Feb. 23, (Continued)

(51) Int. Cl.
*E01C 23/22*  (2006.01)
*E01C 23/16*  (2006.01)
(Continued)

(52) U.S. Cl.
CPC ............ *E01C 23/22* (2013.01); *E01C 23/163* (2013.01); *G06K 9/00798* (2013.01); *H04N 5/2256* (2013.01)

(58) Field of Classification Search
CPC ... E01C 23/22; E01C 23/163; G06K 9/00798; H04N 5/2256
See application file for complete search history.

(56) References Cited

U.S. PATENT DOCUMENTS

| 4,219,092 A | 8/1980 | Richter |
|---|---|---|
| 4,460,127 A | 7/1984 | Hofmann |

(Continued)

FOREIGN PATENT DOCUMENTS

| CA | 2841683 | 8/2014 |
|---|---|---|
| CN | 203047061 | 7/2013 |

(Continued)

OTHER PUBLICATIONS

1st Office Action Dated Oct. 2, 2018 from corresponding Japanese application No. 2016-570922.
(Continued)

*Primary Examiner* — Nga X Nguyen
(74) *Attorney, Agent, or Firm* — Stradley Ronon Stevens and Young, LLP

(57) ABSTRACT

A control system for positioning a marker over a pre-existing roadway surface mark. The control system has an electromagnetic radiation source attached to the marker for producing a mark pattern on the roadway surface. An imager permits the control system to image both the pre-existing roadway surface mark and the mark pattern produced by the electromagnetic radiation source. A computer is responsive to the imager for producing an error signal based upon the location difference between (a) the image of the pre-existing roadway surface mark and (b) the image of the mark pattern produced by the electromagnetic radiation source. An actuator is responsive to the error signal for positioning the marker over the pre-existing.

13 Claims, 17 Drawing Sheets

Related U.S. Application Data 2015, now Pat. No. 10,301,783, which is a continuation-in-part of application No. 14/594,726, filed on Jan. 12, 2015, now Pat. No. 9,230,177, and a continuation-in-part of application No. 13/728,062, filed on Dec. 27, 2012, now Pat. No. 9,298,991, which is a continuation-in-part of application No. 13/351,829, filed on Jan. 17, 2012, now Pat. No. 8,467,968.

(60) Provisional application No. 61/942,847, filed on Feb. 21, 2014.

(51) Int. Cl.
*G06K 9/00* (2006.01)
*H04N 5/225* (2006.01)

(56) References Cited

U.S. PATENT DOCUMENTS

| | | | |
|---|---|---|---|
| 4,832,331 A | | 5/1989 | Brandli |
| 5,169,262 A | * | 12/1992 | Wilson ............... E01C 23/163 404/84.05 |
| 5,203,923 A | * | 4/1993 | Hartman ............... B05B 9/06 118/323 |
| 5,220,876 A | | 6/1993 | Monson et al. |
| 5,296,256 A | | 3/1994 | Hartman |
| 5,375,059 A | | 12/1994 | Kyrtsos et al. |
| 5,529,433 A | | 6/1996 | Huynh et al. |
| 5,540,516 A | | 7/1996 | Nicodemo et al. |
| 5,549,412 A | | 8/1996 | Malone |
| 5,599,133 A | * | 2/1997 | Costello ............... E01C 23/14 404/72 |
| 5,652,655 A | | 7/1997 | Uno et al. |
| 5,653,389 A | | 8/1997 | Henderson et al. |
| 5,739,785 A | | 4/1998 | Allison et al. |
| 5,746,539 A | | 5/1998 | Mara |
| 5,771,169 A | | 6/1998 | Wendte |
| 5,828,585 A | | 10/1998 | Welk et al. |
| 5,836,398 A | | 11/1998 | White |
| 5,838,277 A | | 11/1998 | Loomis et al. |
| 5,848,373 A | | 12/1998 | DeLorme et al. |
| 5,857,066 A | | 1/1999 | Wyche et al. |
| 5,951,201 A | | 9/1999 | Jones |
| 5,990,469 A | | 11/1999 | Bechtel et al. |
| 5,995,902 A | | 11/1999 | Monson |
| 6,074,693 A | | 6/2000 | Manning |
| 6,115,481 A | | 9/2000 | Wiens |
| 6,299,934 B1 | | 10/2001 | Manning |
| 6,330,503 B1 | | 12/2001 | Sharp et al. |
| 6,514,595 B1 | | 2/2003 | Sprouts |
| 6,723,375 B2 | | 4/2004 | Zeck et al. |
| 6,729,706 B1 | | 5/2004 | Patton et al. |
| 6,951,375 B2 | | 10/2005 | Patton et al. |
| 7,029,199 B2 | | 4/2006 | Mayfield et al. |
| 7,370,818 B2 | | 5/2008 | Ward et al. |
| 7,552,008 B2 | | 6/2009 | Newstrom et al. |
| 7,640,105 B2 | | 12/2009 | Nielsen et al. |
| 7,698,032 B2 | | 4/2010 | Matsumoto et al. |
| 7,832,762 B2 | | 11/2010 | Breed |
| 7,866,917 B2 | | 1/2011 | Malit |
| 7,899,611 B2 | | 3/2011 | Downs et al. |
| 7,961,328 B2 | | 6/2011 | Austin et al. |
| 7,970,529 B2 | | 6/2011 | Mori et al. |
| 7,981,462 B2 | | 7/2011 | Bustgens |
| 8,190,362 B2 | | 5/2012 | Barker et al. |
| 8,452,568 B2 | | 5/2013 | Imanishi et al. |
| 8,467,968 B1 | | 6/2013 | Dolinar et al. |
| 8,935,057 B2 | | 1/2015 | Dolinar et al. |
| 9,098,751 B2 | | 8/2015 | Hilldore et al. |
| 9,230,117 B2 | | 1/2016 | Dolinar et al. |
| 9,298,991 B2 | | 3/2016 | Dolinar et al. |
| 9,784,843 B2 | | 10/2017 | Dolinar et al. |
| 2002/0040962 A1 | | 4/2002 | Schofield et al. |
| 2002/0044087 A1 | | 4/2002 | Krasner |
| 2002/0176608 A1 | | 11/2002 | Rose |
| 2003/0058346 A1 | | 3/2003 | Bechtel et al. |
| 2003/0139879 A1 | | 7/2003 | Krasner |
| 2004/0124260 A1 | | 7/2004 | Ward et al. |
| 2001/0160595 A1 | | 8/2004 | Zivkovic et al. |
| 2004/0160595 A1 | | 8/2004 | Zivkovic et al. |
| 2006/0215882 A1 | | 9/2006 | Ando et al. |
| 2007/0081695 A1 | | 4/2007 | Foxlin et al. |
| 2007/0128899 A1 | | 6/2007 | Mayer |
| 2007/0208497 A1 | | 9/2007 | Downs et al. |
| 2008/0046174 A1 | | 2/2008 | Johnson |
| 2008/0091315 A1 | | 4/2008 | Krokel et al. |
| 2008/0203187 A1 | | 8/2008 | Ward et al. |
| 2009/0118994 A1 | | 5/2009 | Mori et al. |
| 2010/0104199 A1 | | 4/2010 | Zhang et al. |
| 2010/0185382 A1 | | 7/2010 | Barker et al. |
| 2010/0256912 A1 | | 10/2010 | Nielsen et al. |
| 2010/0257029 A1 | | 10/2010 | Nielson et al. |
| 2010/0259609 A1 | | 10/2010 | Takahashi |
| 2010/0262470 A1 | | 10/2010 | Nielsen et al. |
| 2010/0263591 A1 | | 10/2010 | Nielson et al. |
| 2010/0295668 A1 | | 11/2010 | Kataoka |
| 2010/0316445 A1 | | 12/2010 | Kasahara et al. |
| 2011/0039021 A1 | | 2/2011 | Persson et al. |
| 2011/0285849 A1 | | 11/2011 | Schofield et al. |
| 2012/0054028 A1 | | 3/2012 | Tengler et al. |
| 2012/0072080 A1 | | 3/2012 | Jeromin et al. |
| 2012/0098657 A1 | | 4/2012 | Bogatine |
| 2012/0113244 A1 | * | 5/2012 | Nielsen ............... G06T 7/90 348/82 |
| 2013/0167385 A1 | | 7/2013 | Schneider |
| 2013/0190981 A1 | | 7/2013 | Dolinar et al. |
| 2014/0233808 A1 | | 8/2014 | Peckover |
| 2015/0127223 A1 | | 5/2015 | Dolinar et al. |

FOREIGN PATENT DOCUMENTS

| | | |
|---|---|---|
| DE | 102005044977 | 3/2007 |
| DE | 102011119478 | 5/2013 |
| DE | 102011119312 | 4/2018 |
| JP | 62-043361 | 2/1987 |
| JP | 07-103760 | 4/1995 |
| JP | 09-137403 | 5/1997 |
| JP | 2007316767 | 12/2007 |
| JP | 2009-139306 | 6/2009 |
| JP | 2009223220 | 10/2009 |
| JP | 2009223817 | 10/2009 |
| JP | 2009258651 | 11/2009 |
| JP | 2009259215 | 11/2009 |
| JP | 2010175756 | 8/2010 |
| JP | 2011-1746 | 1/2011 |
| WO | 2015/119587 | 8/2015 |

OTHER PUBLICATIONS

A Comparative Study of Location Aided Routing Protocols for MANET; Hnatyshin, V. et al.; Wireless Days (WD) 2011 IFIP; Digital Object Identifier; Publication Year 2011; pp. 1-3.

A Study of Precise Road Feature Localization Using Mobile Mapping System; Ishikawa, K., Amano, Y., Hashizume, T., Takiguchi, J.; Advanced intelligent mechatronics, 2007 IEEE/ASME international conference on: 10.1109/AIM.2007.4412541; Publication Year 2007; pp. 1-6.

A vision-based lane detection system combining appearance segmentation and tracking of salient points; Bottazzi, V. S.; Borges, P.V.K.; Jun Jo; Intelligent Vehicles Symposium (IV), 2013 IEEE; Year 2013; pp. 443-448; DOI 10.1109/IVS.2013.6629508.

Click4BuildingID@NTU: Click for Building Identification with GPS-enabled Camera Cell Phone; Chai Kiat Yeo; Liang-Tien Chia; Tat Jen Cham; Rajon, D.; Multimedia and Expo, 2007 IEEE International Conference on; Digital Object Identifier: 10.1109/ICME.2007.4284836; Publication Year: 2007, pp. 1059-1062.

Fusion of map matching and traffic sign recognition; Peker, A.U.; Tosun, O.; Akin, H.L.; Acarman. T.; Intelligent Vehicles Symposium Proceedings, 2014 IEEE; Year: 2014; pp. 867-872, DOI: 10.1109/IVS.2014.6856536.

(56) References Cited

OTHER PUBLICATIONS

GeoLANMAR: Geo Assisted Landmark Routing For Scalable, Troup Motion Wireless Ad Hoc Networks; Zhou B. et al.; Vehicular Technology Conference 2005; 2005 IEEE 61st; vol. 4; Digital Object Identifier; Publication Year 2005; pp. 2420-2424 vol. 4.
GPS Multipath Mitigation for Urban Area Using Omnidirectional Infrared Camera; Meguro, J.; Murata, T.; Takiguchi, J.; Amano, Y.; Hashizume, T.; Intelligent Transportation Systems, IEEE Transactions on; vol. 10, Issue 1; Digital Object Identifier: 10.1109/TITS.2008.2011688; Publication Year 2009; pp. 22-30.
Implementation of GPS for Location Tracking; Ariffin et al.; Control and System Graduate Research Colloquium (ICSGRC), 2011 IEEE; Digital Object Identifier; 10.1109/ICSGRC.2011.5991833; Publication Year 2011; pp. 77-81.
Intelligent Vehicle Localization Using GPS, Compass, and Machine Vision; Limsoonthrakul, S.; Dailey, M.N.; Parnichkun, M.; Intelligent Robots and Systems, 2009; IROS 2009; IEEE/RSJ International Conference on; DOI: 10.1109/IROS.2009.5354042; Publication Year 2009; pp. 3981-3986.
International Search Report for International Application No. PCT/US2015/017034 dated Jul. 24, 2015.
International Search Report dated May 9, 2013 for international application No. PCT/US2013/021684.
Internet Screen Shot from http://pppcatalog.com/laserlux—S.M.A.R.T. Retroreflectivity Readings at Highway Speeds Aug. 17, 2015.
Internet Screen Shot from http://www.roadvista.com/922-handheld-retroreflectometer—922 Handheld Retroreflectometer; Jul. 29, 2015.
Internet Screen Shot from http://www.roadvista.com/laserlux-cen-30-mobile-retroreflectometer—Laserlux CEN 30 Mobile Retroreflectometer; Jul. 29, 2015.
Lane detection with roadside structure using on-board monocular camera; Watanabe, A.; Naito, T.; Ninomiya, Y.; Intelligent Vehicles Symposium, 2009 IEEE; Digital Object Indentifier: 10.1109/IVS.2009.5164276; Publication Year 2009; pp. 191-196.
Light-weight localization for vehicles using road markings; Ranganathan, A.; Illstrup.D.; Tao Wu; 2013 IEEE/RSJ International Conference on Intelligent Robots and Systems (IROS), Nov. 3-7, 2013, Tokyo, Japan; Publication Year 2013; pp. 921-927.
Localization Algorithms for Distributed Platform Among Vehicles; Tsuchiya, T.; Yoshinaga, H.; Lihan, M.; Koyanagi, K.; Ultra Modern Telecommunications & Workshops, 2009; ICUMT'09; International Conference on; DOI: 10.1109/ICUMT.2009.5345615; Publication Year 2009; pp. 1-6.
Map-based Lane Identification and Prediction for Autonomous Vehicles; Leonardo et al.; Electro/Information Technology (EIT), 2014 IEEE International Conference; Publication Year 2014; pp. 448-453.
Mapping and localization using GPS, lane markings and proprioceptive sensors; Tao et al.; 2013 IEEE/RSJ International Conference on Intelligent Robots and Systems (IROS); Publication Year 2013; pp. 406-412.
Notice of Allowance dated Sep. 3, 2014 for U.S. Appl. No. 13/741,573 with PTO-892.
Online Road Segmentation for Urban Complex Environments; Suzuki, M.; Saitoh, T.; Terada E.; Kuroda, Y.; Communications and Information Technologies (ISCIT), 2010 International Symposium on; DOI: 10.1109/ISCIT.2010.5665142; Publication Year 2010, pp. 1039-1044.
Pathway estimation for vision based road following suitable for unstructured roads; Prochazka, Z; Control Automation Robotics & Vision (ICARCV), 2012 12th International Conference on; Year 2012; pp. 1374-1397; DOI: 10.1109/ICARCV.2012.6485346.
Performance analysis of a shipborne gyrocompass with a multi-antenna GPS system; Lu, G.,; Lachapelle, G.; Cannon, M.E.; Vogel, B.; Position Location and Navigation Symposium, 1994., IEEE; Digital Object Identifier: 10.1109/PLANS, 1994.303334; Publication Year: 1994, pp. 337-343.
Road condition monitoring system based on a stereo camera; Jokela, M.; Kutlia, M.; Long Le; Intelligent Computer Communication and Processing, 2009; ICCP 2009; IEEE 5th International Conference on; Year 2009; pp. 423-428 DOI 10.1109/ICCP.2009.5284724.
Segmentation of Dense Range Information in Complex Urban Scenes; Schoenberg, J.R.; Nathan A.; Campbell, M.; Intelligent Robots and Systems (IROS); 2010 IEEE/RSJ International Conference on; DOI: 10.1109/IROS2010.5651749; Publication Year 2010; pp. 2033-2038.
Stop-line Detection and Localization Method for Intersection Scenarios; Marita et al.; Intelligent Computer Communication and Processing (ICCP), 2011 IEEE International Conference; Publication Year 2011; pp. 293-298.
Supplementary Partial European Search Report dated Oct. 26, 2017 for Application No. EP 15752580.
Supporting Drivers in Keeping Safe Speed and Safe Distance: The SASPENCE Subproject Within the European Framework Programme 6 Integrating Project PReVENT; Bertolazzi, E. et al.; Intelligent Transportation Systems, IEEE Trans, on; vol. 11, Issue 3; Digital Object ID: 10.1109/TITS.2009.2035925; Pub. Yr. 2010; pp. 525-538.
Vision for road inspection; Varadharajan, S.; Jose, S.; Sharma, K.; Wander, L.; Mertz, C.; Applications of Computer Vision (WACV), 2014 IEEE Winter Conference on; Year 2014; pp. 115-122; DOI 10.1109/WACV.2014.6836111.
U.S. Appl. No. 15/117,952, filed Aug. 10, 2016.
Application No. PCT/US2015/017034 filed Feb. 23, 2015.
U.S. Appl. No. 14/594,726 filed Jan. 12, 2015; now U.S. Pat. No. 9,230,177 issued Jan. 5, 2016;.
U.S. Appl. No. 61/942,847, filed Feb. 21, 2014;.
U.S. Appl. No. 13/728,062 filed Dec. 27, 2012; now U.S. Pat. No. 9,298,991 issued Mar. 29, 2016.
U.S. Appl. No. 13/351,829 filed Jan. 17, 2012; now U.S. Pat. No. 8,467,968 issued Jan. 18, 2013.

* cited by examiner

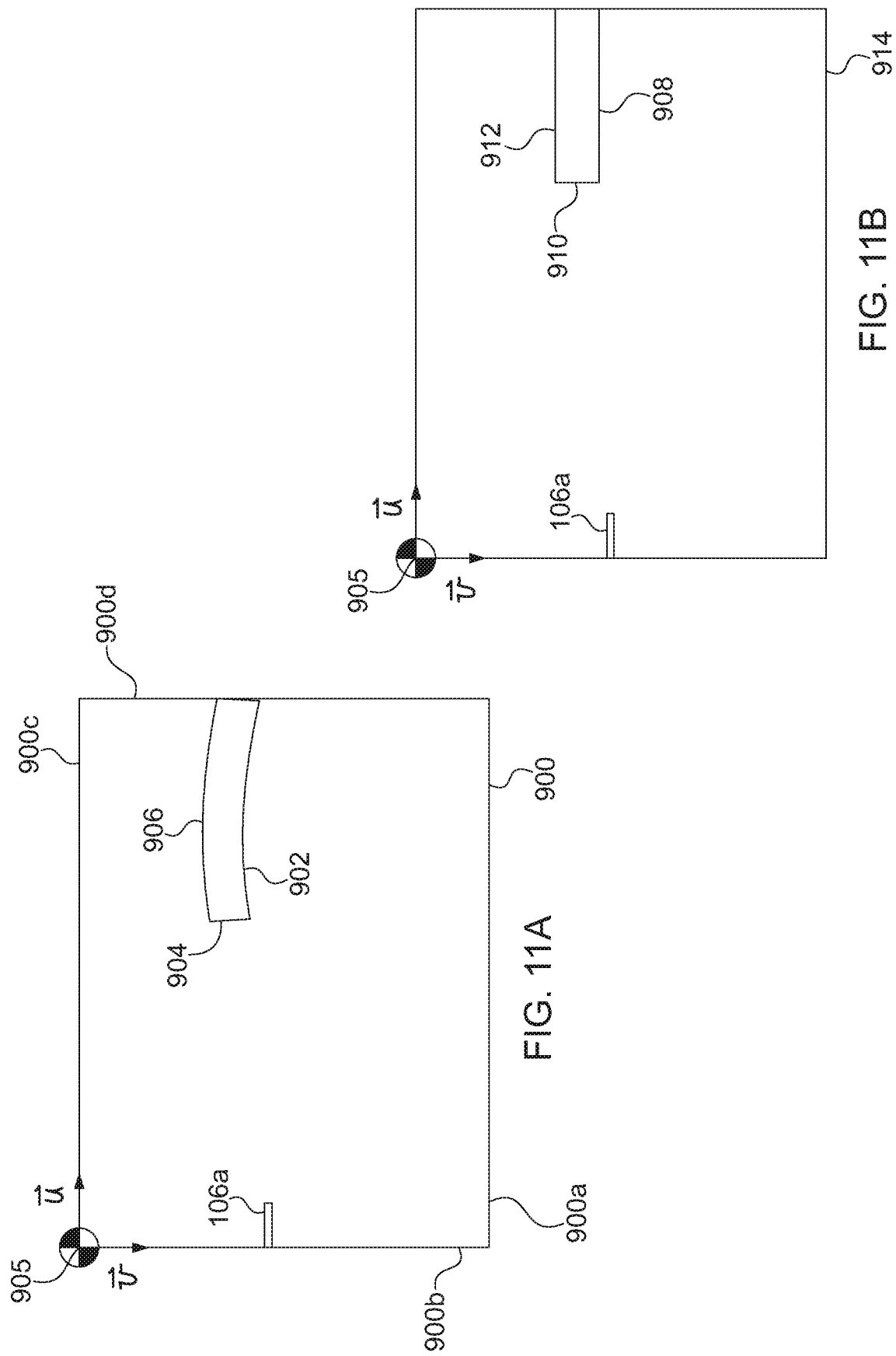

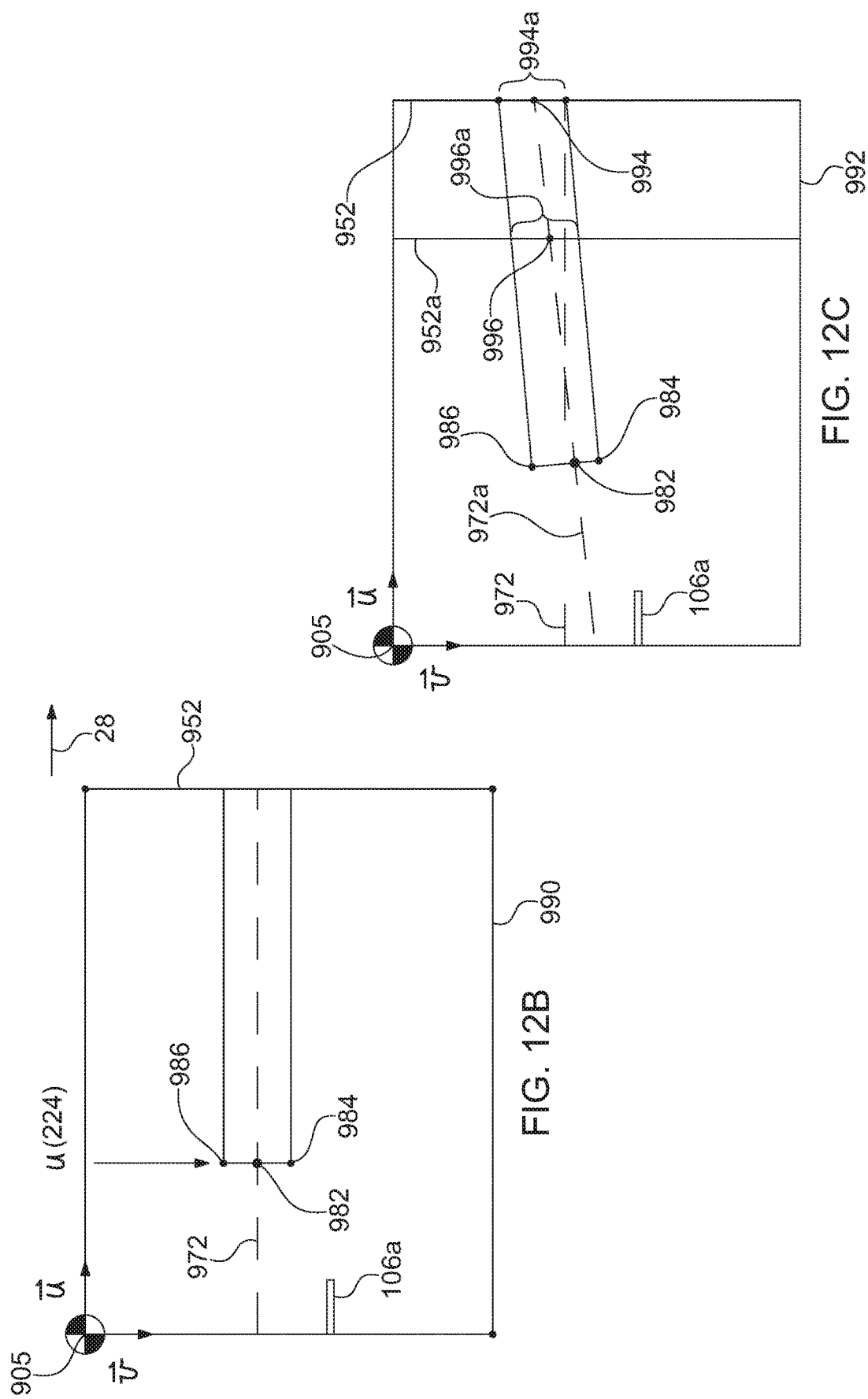

ROADWAY MAINTENANCE STRIPING CONTROL SYSTEM

CROSS REFERENCE TO RELATED APPLICATIONS

This application is a divisional of U.S. patent application Ser. No. 14/117,952, filed on Aug. 10, 2016, and will issue as U.S. Pat. No. 10,301,783 on May 28, 2019, which is a continuation-in-part of U.S. patent application Ser. No. 13/728,062, filed on Dec. 27, 2012, and issued as U.S. Pat. No. 9,298,991 on Mar. 29, 2016, which, in turn, is a continuation-in-part of U.S. application Ser. No. 13/351,829, filed on Jan. 17, 2012, and issued as U.S. Pat. No. 8,467,968 on Jan. 18, 2013; this application also claims the benefit of priority to U.S. Provisional Application No. 61/942,847 filed on Feb. 21, 2014 and U.S. patent application Ser. No. 14/594,726 filed on Jan. 12, 2015, and issued as U.S. Pat. No. 9,230,177 on Jan. 5, 2016, respectively; this application incorporates by reference into this document all of these prior applications in their entirety and for all purposes.

TECHNICAL FIELD OF THE INVENTION

This present invention relates generally to equipment for applying roadway lane demarcation markings onto a roadway surface and, in particular, to equipment for maintaining pre-existing roadway lane marks by automatically applying new roadway marking material from a moving vehicle directly over and on top of a pre-existing roadway mark using machine vision technology.

BACKGROUND OF THE INVENTION

Existing roadway surfaces will typically include roadway lane demarcation markings to assist motorists for visually identifying lanes for controlling and directing traffic. In many cases the roadway markings are placed directly onto the roadway top surface and usually consist of paint of various colors such as white or yellow for asphalt-covered roadways, or white or yellow onto a black painted background to accentuate contrast between the roadway surface and mark (used especially on lighter-colored concrete roadways). In other cases, roadway markings may be placed in grooves previously milled into the roadway surface.

The visible contrast between the roadway surface and the roadway mark is an important consideration for drivers of vehicles to be able to quickly and reliably discern the correct traffic lane under both daytime and nighttime, dry and wet, roadway driving conditions.

Different materials have been perfected for roadway markings. The most common roadway marking material is in liquid form (generically called "paint") which is sprayed onto the roadway surface from a forward-moving paint vehicle along a desired roadway mark path. The liquid material then dries, cures or solidifies forming a dry and semi-permanent roadway marking. The applied thickness of the liquid marking material may be approximately twenty thousandths of an inch (0.5 mm), but may also vary depending upon the roadway surface roughness, application specifications, and the type of marking material. Some common liquid marking materials include epoxy, polyurea, traffic paints, or other commonly used marking materials specifically formulated for the roadway marking industry. Examples of roadway marking material manufacturers include Sherwin-Williams of Baltimore, Md. and Epoplex Inc. of Maple Shade, N.J.

Hot thermoplastic material is also commonly used as the roadway marking material. This material is first heated and melted, and then while in a liquefied, molten state, either sprayed (under pressure), ribbon extruded, or applied from a trough or shoe (screed) onto the roadway surface. Cold preformed sections (usually three feet or 91 cm in length) of thermoplastic can also be placed into position along the desired roadway mark path and then semi-liquefied with a torch. The semi-liquefied thermoplastic material first conforms to the roadway surface and then quickly cools and solidifies, binding to the roadway surface forming the desired roadway mark.

Another material used for roadway marks is supplied in tape form. The specially formulated roadway marking tape is the actual roadway mark in continuous flexible form having an adhesive coating on the bottom surface for affixing the roadway marking tape to the roadway surface. This product may be directly applied on the top surface of the roadway surface, inlaid directly into hot asphalt roadway surfaces, or preferably applied into a groove which has been previously milled into the roadway surface. An example of a continuous roadway marking tape product is Stamark™ Pavement Marking Tape manufactured by the 3M Company of St. Paul, Minn.

All of the above roadway mark materials are effective for visibly defining the roadway lane demarcation marks during daytime and clear weather conditions, but are less effective during wet and nighttime conditions.

To increase the wet and nighttime visibility of the roadway mark, reflective elements are applied onto the roadway mark material during the application process. These reflective elements reflect the on-coming headlights of an approaching vehicle back towards the approaching driver greatly improving nighttime visibility of the roadway mark. Reflective elements may be dispensed onto the top surface of either the freshly sprayed roadway marking or the melted thermoplastic to further improve the nighttime visibility of the roadway markings. Tape products may also integrate the reflective elements into the tape surface forming a composite reflective surface.

The most common reflective elements which are co-applied with the liquid or thermoplastic roadway marking material are small and generally spherically shaped glass beads. The beads are constructed so that they will efficiently back-reflect light from oncoming headlights thus self-illuminating the roadway mark. The term "retro-reflectivity" is used to describe this phenomenon.

For liquid-based sprayed materials, beads are commonly dispensed with a velocity equal and opposite that of the forward moving paint truck so that the beads fall almost vertically downward under the force of gravity and partially embed themselves onto the top surface of the freshly applied marking material. The top portion of the bead is exposed and thus able to retro-reflect the oncoming vehicle headlights.

The size of roadway beads varies but the most common bead diameters range from approximately fifteen to fifty thousandths of an inch (0.4 to 1.2 mm). A popular manufacturer of roadway marking glass beads is Potters Industries LLC of Malvern, Pa.

As the liquid marking material dries, cures, or in the case of liquefied (molten) thermoplastic, cools and solidifies, the beads are in effect glued and affixed to the marking material and hence to the roadway surface. The marking material (often referred to as the binder) along with the imbedded beads form a hard composite structure having a rough raised and exposed top surface. The exposed portion of the bead above the cured binder captures and back reflects part of the on-coming light from vehicle headlights. The thickness of the finished roadway marking includes the thickness of the hardened binder along with the exposed portion of the bead above the cured liquid material surface.

Beads of two or more different diameters may also be simultaneously dispensed together to achieve different reflectivity properties for different environmental roadway conditions. Other non-spherical reflective elements may also be dispensed singularly or in combination with other types of reflective elements.

For example, twenty thousandths inch (0.5 mm) diameter beads may be co-dispensed with fifty thousandths inch (1.25 mm) diameter beads to better improve wet (rainy) nighttime roadway reflectivity. Dispensing two different types of reflective components is commonly referred to as a double drop process. Dispensing three types of reflective components (for example, two different sized beads and one irregularly sized reflective element) is referred to as a triple drop process.

A portion of the larger diameter bead may be able to protrude above the wet film thickness of the water on a wet roadway surface and still retro-reflect light from oncoming headlights. Because the larger diameter beads protrude significantly above the road surface, however, they are more susceptible to degradation over time. In contrast, the smaller diameter beads may be completely submerged under the wet film thickness of the water on a wet roadway surface and will not effectively capture, and therefore not back-reflect, the light from oncoming headlights, but because of their smaller size, are less susceptible to degradation over time. Other irregular shaped and dimensioned reflectivity elements are sometimes additionally dispensed along with beads to further improve roadway marking reflectivity under wet roadway conditions.

For roadway mark material supplied in tape form, the reflective elements are usually directly integrated into the tape and form a continuous composite structure. Some tape products have reflective elements that are imbedded in a polygon-shaped, raised profile arranged in a waffle-like pattern to capture and back-reflect the light from oncoming vehicle headlights for both dry and wet nighttime conditions.

All of the above solutions are effective in producing initially high-contrast differentiation between the roadway marks and the roadway surface under different environmental driving conditions. This initially high contrast differentiation tends to degrade over time, however, for various reasons. For example, the actual binder material which defines the visible reflective shape of the roadway mark (usually rectangular shaped) may become worn with vehicular traffic and the passage of time, and may further become discolored because of lengthy exposure times to ultra-violet radiation from the sun. Further, black tire scuff marks may occur on the surface of the roadway mark further degrading mark visibility.

Differences in the coefficients of thermal expansion between the binder material and roadway surface may also cause a physical separation between them further degrading the ability to maintain a consistently visible roadway mark. Seasonal roadway temperature variations over time may cause cracking and peeling of the roadway mark further degrading the effectiveness of the marking.

The reflective elements for the liquid, thermoplastic, and tape applications which are installed along with their respective binder may wear away quickly as the result of frictional contact between the tires of passing traffic and the applied roadway mark. Roadway mark degradation also occurs as the result of the partial or complete scraping removal of the binder and its reflective beads or reflective elements from plows attempting to clear the roadway surface of snow in northern climates. Usually the exact positions of the roadway lanes, and therefore the roadway marks defining those lanes, are not visible during the snow-plowing process thereby increasing the probability that the marks will be accidentally scraped and removed by the plow.

To maintain effective contrast between the roadway mark and roadway surface, roadway transportation agencies and others may periodically employ different roadway mark reapplication processes to maintain roadway mark contrast and visibility. One process first removes the worn pre-existing mark by specialized grinding machines (commonly called "grinding trucks") or with a pressurized and circulating stream of water (commonly called "water blasting"). A new roadway mark is then reapplied onto the bare roadway surface at approximately the same position where the original mark existed. This particular reapplication process is costly and inefficient because it requires use of a dedicated and expensive piece of equipment (commonly referred to as a "grinding truck" or a "water blaster") or a combination of marking-removal machines, to first remove the pre-existing worn lines, and then additional time and labor costs are required to again lay out a new roadway mark path and apply the new roadway marking. Furthermore, the motoring public is inconvenienced as the result of traffic lane closure for both the removal and the subsequent layout and reapplication of the roadway marks.

Another more popular and less expensive reapplication process applies new roadway mark material (for example paint and, if required, reflective elements) directly on top of the pre-existing roadway mark without removing the worn pre-existing roadway mark. This process of reapplying roadway mark material directly on top of the pre-existing roadway mark is commonly referred to as "maintenance striping," and is the subject of this invention. Common maintenance striping processes may include a completely manually controlled process, or the completely manually controlled process may be partially automated. Both types of maintenance striping processes are now discussed.

For the completely manually controlled maintenance striping process, a driver first positions the paint truck along the pre-existing roadway mark path and then forwardly moves the truck in a longitudinal direction along the mark path at a speed consistent with the roadway mark material dispensing application process. Having a clear frontal perspective view of the pre-existing roadway mark, the driver maintains the paint truck position and truck path substantially parallel with the pre-existing roadway mark path.

As the paint truck proceeds along the pre-existing roadway mark path, a first operator situated towards the rear of the paint truck and having an unobstructed view of the pre-existing roadway mark controls the lateral position of the roadway mark material dispensing hardware (usually a moveable carriage more fully described below) and process on one side of the paint truck (for example, the left side for painting a center line in the United States). A second operator may also be stationed towards the rear of the paint truck for controlling the roadway mark dispensing hardware and process on the opposite side of the paint truck (for example, the right side for painting a lane edge line). These operators are responsible for both properly aligning the material dispensing hardware over the pre-existing roadway mark and also for controlling the timing of when to begin, and when to end, the dispensing of the roadway mark material.

For long lengths of solid line roadway mark dispensing (such as roadway center lines), the operators are primarily concerned with only aligning the dispensing hardware over the pre-existing mark and are not so concerned with continuously controlling the timing of when to begin, and when to end, the dispensing of the roadway mark material except at the beginning and end of the solid line mark. This is not the case, however, for repetitive skip line patterns where the operators must continuously align the dispensing hardware over the pre-existing roadway mark and simultaneously monitor and adjust the paint truck dispensing system to insure that the newly applied marking accurately reproduces the existing skip line pattern by periodically manually correcting the timing of when to begin, and when to end, the dispensing of the roadway mark material.

Manual maintenance striping of a roadway mark therefore requires a driver to steer and align the paint truck along the pre-existing roadway mark path and at least one and possibly two operators for controlling both the lateral position of the roadway mark dispensing hardware and timing of when to begin, and when to end, the dispensing of the roadway mark material.

The dispensing hardware for liquid (or other types) of mark material (for example, an epoxy binder) usually consists of two laterally extendable and hydraulically controlled carriages mounted on opposite sides of the paint truck. Left and right side carriages are usually provided so that the center and side lines may be painted (either singularly or simultaneously) as the paint truck moves along the roadway mark path, and are controlled by their respective operators. The carriages further have attached and downwardly directed guns which spray the roadway mark binder material (for example, paint) onto the roadway surface. Reflective media dispensing guns may also be affixed to the carriage rearward of the roadway mark binder spray guns. Other roadway mark materials may require different dispensing hardware which is compatible with the particular roadway mark material.

The hydraulic control system for each carriage may include a conventional hydraulic steering control unit which cooperates with one or more hydraulically operable cylinders having a moveable piston (which is further attached to a piston rod) for laterally extending and retracting the carriage (one end of the cylinder is fixed to the paint truck body and the piston rod is attached to the carriage). The hydraulic steering control unit controls the direction of hydraulic fluid to the hydraulic responsive piston which in turn either laterally extends or retracts its respective carriage.

The operators manually control the lateral position and movement of the left and right side mounted carriages (and therefore the liquid binder and bead gun lateral positions) by controllably rotating the hydraulic steering control unit via a conventional steering wheel. Turning the steering wheel in one direction may extend the carriage while turning the steering wheel in the opposite direction may retract the carriage, with the lateral velocity of the carriage determined by how quickly the operator can physically turn the steering wheel.

The hydraulic carriage control system allows the respective operators to laterally align the roadway mark material dispensing hardware over the pre-existing roadway mark path and to adjust the carriage position to account for slight positional inaccuracies of the driver in positioning the paint truck when attempting to follow the roadway mark path, especially around curved roadway mark paths.

Having aligned the guns at the correct lateral position with the pre-existing roadway mark path, the operator must then decide when to begin and when to end the dispensing of the roadway mark material as the paint truck proceeds along the pre-existing roadway mark path. Usually the operator attempts to start dispensing mark material at the beginning edge of the pre-existing line segment. To accomplish this task, the operator must first visually locate the leading edge of the line segment and then estimate when to begin dispensing the roadway mark material taking into consideration the inherent turn-on delay of the dispensing valves and vehicle speed. Variations in both truck speed, dispensing valve turn-on delay, and operator response time usually result in positional misalignment between the actual beginning, or leading edge, of the pre-existing roadway mark line segment and the starting edge of the newly applied mark line segment. A positional alignment tolerance between the actual leading edge of the pre-existing roadway mark line segment and the starting edge of the newly applied mark line segment is usually allowed by most transportation agencies or others responsible for maintaining roadway markings. A mark edge positional tolerance may be plus or minus a number of inches (or centimeters) and can vary according to a particular transportation agency or other defined specification.

Having started dispensing the roadway mark material on top of the pre-existing mark, the operator continues to dispense the roadway mark material until the trailing edge of the pre-existing mark line segment comes into view, at which time the operator attempts to judge the proper time at which to stop the dispensing process. Trailing edge positional errors between the pre-existing mark and the newly applied mark may occur because of variations in truck speed, dispensing valve turn-off delays, and operator response time. Slower vehicle speeds may be necessary to give the operators more time to determine when to begin, and when to end, the dispensing of mark material thereby minimizing the leading and trailing mark edge positional alignment errors. A slower moving truck increases the amount of time necessary, however, to reapply the mark material over the pre-existing mark.

Although successful in dispensing new roadway mark material on top of a pre-existing roadway mark, the manual process is prone to human error based upon the fact that the operator must simultaneously laterally align the dispensing hardware and control the timing when to begin and end the dispensing of mark material.

In addition, the operator cannot accurately determine the actual length of the line segment and will usually dispense new roadway mark material over the entire length of the visible pre-existing line segment without regard to the original line segment specification. For example, a common 15/40 skip-line pattern should include a 15 foot (450 cm) line segment with a 25 foot (750 cm) gap. Because of previous restriping activities, however, the 15 foot (450 cm) line segment may have been over sprayed and lengthened to a 17 foot (520 cm) line segment. With a manually controlling restriping process, the operator may overly dispense and restripe the entire 17 foot (520 cm) line segment even though the original specification calls for a 15 foot (450 cm) line segment, thus unnecessarily wasting a good percentage of roadway mark material. Alternately, the operator may short-dispense the line segment of a skip-line pattern. For example, if the required 15 foot (450 cm) paint line segment was previously under sprayed to a length of 13 feet (400 cm), the operator may only restripe the previous most recent and visible 13 foot (400 cm) line segment (the remaining 2 foot (60 cm) line segment of the original 15 foot (450 cm) line segment being worn away).

In an attempt to minimize the edge positional errors and to stripe the specified line segment length, "timer-based" controller systems have been created to assist the operator during the restriping process. These partially automated systems typically determine the distance travelled by the paint truck along the roadway mark path and use this information to appropriately turn-on and turn-off the paint guns (or other roadway mark material dispensing apparatus, including, for example, bead dispensing systems) to create the desired skip-line pattern. An example of a commercially available system for controlling the dispensing of roadway mark materials is model SM-5 manufactured by Skip-Line Inc. of La Grande, Oreg.

The distance travelled by the paint truck may be determined from a drive shaft-mounted aluminum ring having a number of permanent magnets imbedded around the outer circumference of the ring. As the drive shaft (and hence the attached ring) rotates, the spatially changing permanent magnetic flux is detected by a chassis-mounted conventional Hall-effect sensor or other magnetically responsive sensor which outputs a series of electrical pulses. For example, having twenty permanent magnets imbedded in the ring will produce twenty pulses for each drive shaft rotation. Because drive shaft rotation also causes rear wheel rotation via the rear axle and differential, the number of pulses produced at the drive shaft location will be proportional to the rear wheel rotation, and hence proportional to the linear distance travelled by the vehicle. The equivalent linear distance travelled per pulse is usually first determined by a calibration procedure before a roadway is restriped.

To calibrate the system, the driver will first physically measure a known length of roadway (for example, 1,000 feet or 300 m). The truck is then driven along this known length of roadway and the number of pulses produced by the magnetically responsive sensor is recorded by the timer. Knowing the distance travelled (in feet or other convenient length unit) and the number of corresponding pulses produced for this distance by the magnetically responsive sensor allows the system to calculate the equivalent linear distance (feet) travelled per pulse, and which may also be used to calculate vehicle speed in miles per hour (feet per pulse*pulses per second*3,600 seconds per hour*1 mile per 5,280 feet). The distance travelled by the paint truck may then be determined by counting the number of pulses and can therefore be used to determine an accurate line segment and gap lengths for dispensing the roadway mark material.

For example, after completing the calibration procedure, one pulse from the magnetically responsive sensor may correspond to a travelled distance of 1.2 inches (30 mm). Assuming a 15/40 skip line is to be restriped, the controller would turn-on the valves to dispense roadway mark material for 150 pulses ((15 feet*12 inches per foot)/(1.2 inches per pulse)) and subsequently turn-off the valves thereby not dispensing the roadway mark material for 250 pulses. This turn-on and turn-off cycling of the dispensing valves would be repeated for the entire length of the skip line. The controller may also compensate for the turn-on and turn-off delay times of the dispensing valves, and other timing advance or delay issues.

Assuming the calibration distance to pulse ratio is constant throughout the restriping process, these types of controllers can repeat the painted line segment and gap lengths with good positional accuracy.

The distance to pulse ratio may change, however, during the restriping process. For example, it is well known that tire diameter is a function of tire pressure, and that tire pressure is a function of tire temperature. Variations in tire temperature can therefore cause changes in the diameter of the tire which subsequently changes the previously calibrated distance to pulse ratio. For example, increases in tire temperature during the restriping process may cause a change in tire pressure. This change in tire pressure may result in a change in tire diameter which may result in a distance error per tire revolution. Besides the change in temperature ultimately affecting the distance travelled per tire revolution, the operators may decide not to recalibrate the distance-to-pulse ratio before beginning a new painting application but instead rely upon previous distance-to-pulse values. Other factors may also affect the distance travelled per tire revolution such as tire wear and tire deflation caused by leaking or inoperable tire valves.

Errors caused by changes in the distance-to-pulse ratio during the restriping process, or by using previous and not current ratios, are cumulative and cause positional errors in the painted line segment and gap lengths. For example, assuming a 15/40 skip line is to be restriped and assuming an initial 1.2 inches (30.5 mm) per pulse ratio, a change from 1.2 inches (30.5 mm) per pulse to 1.25 inches (31.75 mm) per pulse would produce a skip line mark of 15.625 feet (476 cm) and not the desired 15 foot (457 cm) long skip line mark, a difference of 7.5 inches (19 cm). The gap length will also change from 25 feet (762 cm) to 26.04 feet (792 cm), a difference over one foot (30 cm). This dispensing cycle error is cumulative and continues throughout the restriping process, and if not quickly corrected results in an unacceptable restriped roadway mark pattern.

To adjust the dispensing cycle to account for slight variations in positional dispensing of the roadway mark material caused by the errors in the distance-to-pulse ratio or other errors, the operators visually observe the beginning position of where the roadway mark material is being dispensed and visually compare this position with the beginning position of the pre-existing roadway mark. If the start position of the dispensed roadway mark is not aligned with the start position of the pre-existing mark, the operators must manually lead (advance) or lag (delay) the timing of when to dispense the roadway mark material (commonly referred to as jogging) to realign subsequent start positions.

The accuracy of restriping exactly over the pre-existing roadway mark is greatly dependent upon the ability of the material-dispensing operators to both laterally align the carriage (and therefore the dispensing hardware, i.e., the paint-spraying guns) over the roadway mark as the paint truck moves along the roadway mark path, and further to advance or delay the dispensing starting position of the roadway mark material to account for any variations in the distance-to-pulse ratio and other factors. The positional accuracy of the partially automated restriping process is therefore dependent upon the accuracy and consistency of the calibration procedure and again on the judgment of the material-dispensing operators, and therefore is prone to errors.

Furthermore, the requirement that the operators have an unobstructed view of the roadway mark for both laterally aligning the carriage over the roadway mark and for advancing or delaying the timed dispensing cycle usually places the operators towards the rear of the paint vehicle and therefore in harm's way of high speed passing or common lane traffic. Documented operator injuries have occurred because of collisions between the rear portion of the paint truck and passing or common lane traffic.

Previous attempts to completely automate the maintenance restriping of pre-existing roadway marks have particularly included systems which use the optical characteristics of the previously applied roadway mark material for controlling the lateral position of the mark material guns and the actual timing of when to begin and end the application of mark material.

For example, U.S. Pat. No. 3,101,175 issued to Carl F. Brown teaches a paint truck having a closed circuit television system which is used to assist the paint truck driver in guiding the vehicle along the roadway mark path. The driver of the truck must carefully position the vehicle adjacent to the pre-existing roadway mark and, using the television image of the pre-existing roadway mark, attempt to steer the paint truck to continuously align the roadway mark dispensing hardware over the pre-existing roadway mark. The driver must continuously monitor the television receiver to maintain the dispensing hardware alignment over the pre-existing mark position in addition to controlling when to start and stop the dispensing of roadway mark material. Although this patent attempts to eliminate the operator from the rear of the paint truck, maintaining an accurate dispensing position over the pre-existing roadway mark is difficult because of the simultaneous tasks required of the driver to properly dispense the roadway mark material at exact times while maintaining both the truck and roadway material dispensing hardware alignment with the current roadway mark path, and also attempting to control the position of the paint truck along the pre-existing roadway mark path.

U.S. Pat. No. 3,229,660 issued to J. L. McLucas et al. teaches an apparatus for selectively applying roadway marking material to highway pavements and also for automatically controlling a paint-applying vehicle along a predetermined roadway mark path. Information-bearing signal elements placed beneath or on top of the roadway surface define a predetermined roadway mark pattern. The information-bearing elements may include strips of metal or radioactive material embedded into the roadway surface, or the previously affixed and optically responsive roadway mark material (paint). Detectors responsive to the respective information-bearing elements control dispensing new roadway mark material. A photocell is disclosed for detecting the presence of a painted roadway mark. A signal is generated when a roadway mark is detected which is then used to control the dispensing of mark material. The optical detectors work well assuming that there is sufficient roadway marking material available on the roadway surface for the photocell to optically distinguish between a marked and unmarked surface. This situation rarely occurs because traffic has diminished the optical distinguishing characteristics of the previously applied mark or has completely removed the mark from the roadway surface. The invention is therefore capable of applying mark material only at those positions where sufficient previously applied roadway mark material is currently optically detectable.

U.S. Pat. Nos. 5,054,959 and 5,169,262 issued to Wilson et al. teach a pavement line marking apparatus which comprises a support structure mounted to a moving paint truck having a marking detector (line scan camera) for detecting an old line marking, a transversely moveable and controllable paint applicator for depositing paint onto the old line marking, and a control system responsive to a signal from the marking detector to move the paint applicator into a position over the old line marking and to controllably deposit paint onto the old line marking. These apparatus work well if the old line marking is detectable by the marking detector but fail if some of the old line marking has been completely obliterated along the current roadway mark path. Further, if the beginning of the line mark is not clearly identified by the marking detector, the paint will not be deposited until the beginning of the line mark edge is clearly identified by the mark detector.

U.S. Pat. No. 5,203,923 issued to William H. Hartman teaches a control system for repainting old paint markings comprising a source of light which illuminates and electromagnetically stimulates the pre-existing roadway mark. A spectroscopic detector analyzes the spectral content of the reflected light from the pre-existing roadway mark to determine the presence or absence of known preselected chemical constituents of the mark material for both controlling roadway mark material dispensing and for tracking the roadway mark path. Reliable detection of the roadway mark requires, however, that the electromagnetic spectral emission response of the chemical constituents of the roadway mark material be matched with the wavelength of the illumination to achieve the greatest amount of stimulated (fluorescence) spectral emission, and if the mark is worn away by traffic it no longer provides stimulated emission.

U.S. Pat. No. 5,456,548 issued to Smyrk et al. discloses an apparatus for applying lines of pre-existing roadway mark configurations onto a roadway or pavement surface and to accurately repeat the roadway mark patterns. The apparatus comprises a survey system mounted near the front of the paint vehicle having a roadway mark detector (a charge-coupled device, or "CCD," line scanning camera) to transversely scan the roadway surface, and a pattern transition detector taught by a neural network to recognize line pattern changes, and in response thereof, control the dispensing of mark material to accurately repeat the line pattern changes. The accuracy of the apparatus in determining the exact point at which a transition occurs between the current line pattern and a following line pattern (for example a mark and skip pattern), and therefore the dispensing of roadway mark material, depends upon how well the neural network is able to learn from the various pattern changes.

Although current maintenance striping technology using the optical characteristics of the previously applied roadway mark material for controlling the dispensing of roadway mark material has been partially successful, further improvements to the prior art may be made to more fully automate and increase the accuracy and speed of the restriping process and eliminate the carriage operator or operators from the rear of the vehicle, thus requiring only one operator (the driver of the paint vehicle) to complete the restriping process.

For example, an apparatus to fully automate the restriping process should (1) automatically and accurately align the roadway mark material dispensing gun(s) at the beginning edge location of the first mark of the first striping cycle and the beginning edge locations of subsequent marks throughout the restriping process; (2) automatically and accurately dispense roadway mark material over the pre-existing roadway mark(s); (3) accurately maintain mark and gap lengths for each skip-line cycle; (4) automatically dispense roadway mark material (including the binder material and reflective components) for single, double, or shadow (contrast) line applications; (5) monitor the dispensing process of roadway mark materials; (6) be easily installed and retro-fitted to existing line-striping vehicles, and particularly for line-striping vehicles having a manually controlled hydraulically operated carriage positioning system; (7) automatically determine the desired skip-line pattern; (8) automatically self-calibrate the distance-to-pulse ratio during the restriping process; (9) reduce errors in determining the distance-to-pulse ratio; and (10) improve the start and ending positional alignment between the newly applied and pre-existing roadway marks, with or without the pre-existing roadway mark being optically detectable. Other improvements will become apparent in view of the present invention.

None of the prior art addresses all of these requirements. Thus, there is a need in the roadway marking industry for a roadway mark maintenance striping apparatus that requires less manual labor, increases operational safety for the operators, is more accurate and efficient and less expensive than the current roadway maintenance striping technology available today.

BRIEF SUMMARY OF THE INVENTION

To meet the needs identified above and others which will be apparent from a review of the current maintenance striping technology and in view of its purposes, the present invention provides a new and improved apparatus and method for accurately applying new line marking material over pre-existing roadway marks regardless of the condition of the current roadway marks and without the need for an operator to control the maintenance striping process.

To overcome the shortcomings of current roadway mark maintenance restriping technology, a new apparatus and method for placing marks over pre-existing marks along a roadway mark path are provided. A basic object of the invention is to provide an improved apparatus for automatically repainting or otherwise replicating existing traffic lane demarcation lines on roadway or other surfaces.

Another object of the invention is to provide an improved apparatus for automatically repainting or otherwise replicating partially obliterated traffic lane demarcation lines on roadway or other surfaces.

Another object of the invention is to provide an improved apparatus for automatically repainting or otherwise replicating completely obliterated non-visible traffic lane demarcation line segments on roadway or other surfaces.

A further object of the invention is to provide an improved apparatus to automatically and accurately align the roadway mark dispensing hardware over the pre-existing roadway mark(s).

Yet another objective of the invention is to provide an improved apparatus to automatically and accurately align the roadway mark dispensing hardware over pre-existing solid single or double roadway mark(s).

And yet another object of the invention is to provide an improved apparatus to automatically and accurately align the roadway mark dispensing hardware over pre-existing skip line single or double roadway mark(s).

Another object of the invention is to provide a machine vision based control system for aligning the roadway mark material dispensing hardware directly over the pre-existing solid roadway mark.

Another object of the invention is to provide a machine vision based control system for aligning the roadway mark material dispensing hardware directly over the pre-existing skip line roadway mark.

And yet another object of the invention is to provide an improved apparatus for accurately maintaining mark and gap lengths for skip-line marks.

Still another object of the invention is to provide an improved apparatus to provide an accurate start and end positional alignment between the newly applied and pre-existing roadway marks.

A further object of the invention is to provide an apparatus easily installed on existing roadway or other mark striping vehicles.

A further object of the invention is to provide an apparatus easily installed on existing roadway or other mark striping vehicles having a conventional hydraulically controlled paint carriage.

Another object of the invention is to provide an apparatus which automatically and dynamically calibrates the distance traveled by a striping vehicle.

Another object of the invention is to provide an apparatus which automatically and dynamically calibrates the distance traveled by a striping vehicle using machine vision.

Yet another object of the invention is to provide an apparatus which computes a roadway mark path.

Another object of the invention is to provide an apparatus which computes a roadway mark path projection.

Another object of the invention is to provide an apparatus which computes a roadway mark path projection using machine vision techniques.

Other objects will become apparent in view of the present invention.

The present invention includes a control system for positioning a marker over a pre-existing roadway surface mark. The control system has an electromagnetic radiation source attached to the marker for producing a mark pattern on the roadway surface. An imager permits the control system to image both the pre-existing roadway surface mark and the mark pattern produced by the electromagnetic radiation source. A computer is responsive to the imager for producing an error signal based upon the location difference between (a) the image of the pre-existing roadway surface mark and (b) the image of the mark pattern produced by the electromagnetic radiation source. An actuator is responsive to the error signal for positioning the marker over the pre-existing roadway mark.

The present invention further includes an apparatus for restriping a pre-existing substantially rectangular roadway mark. The roadway mark has been previously placed on a roadway surface along a roadway mark path. The apparatus comprises a vehicle for moving along the roadway mark path having a roadway marker for dispensing roadway mark material onto the pre-existing roadway mark. An imager mounted on the vehicle is downwardly focused onto the roadway surface for imaging at least two longitudinally displaced and laterally directed line segments of the roadway mark. A system is responsive to the imager (i) for predicting the roadway mark path for aligning the roadway marker over the predicted roadway mark path and (ii) for determining the roadway marker restriping dispensing time from the at least two longitudinal displaced and laterally directed line segment images.

The present invention still further includes an apparatus for automatically determining the speed of a vehicle travelling along a skip line roadway mark path. The apparatus comprises a signal generator for producing time deterministic trigger signals. An object space calibrated imager is responsive to the signal generator for producing triggered images of similar feature characteristics of the skip line roadway mark. A computer is responsive to the signal generator and imager for determining the time difference between and object space location differences of similar feature characteristics of the skip line roadway mark between triggered images, and determining the speed of the vehicle from the time and object space location differences.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 11A is a raw image of a roadway mark showing optical barrel and perspective distortions;

FIG. 11B is a corrected image of a roadway mark with optical barrel and perspective distortions substantially eliminated;

FIG. 12B is a second corrected image of an imaged roadway mark of FIG. 12A, but imaged at a later time;

FIG. 12C is a third corrected image of an imaged roadway mark of FIG. 12A, but imaged at a later time and having the relative distance between the vehicle and roadway mark path diverging and also illustrates intermediary roadway mark path points;

DETAILED DESCRIPTION OF THE INVENTION

The present invention provides machine vision based roadway marking systems used for repainting or otherwise replicating existing roadway traffic lane demarcation lines on roadway surfaces, a process commonly referred to as maintenance restriping.

Figure 1:
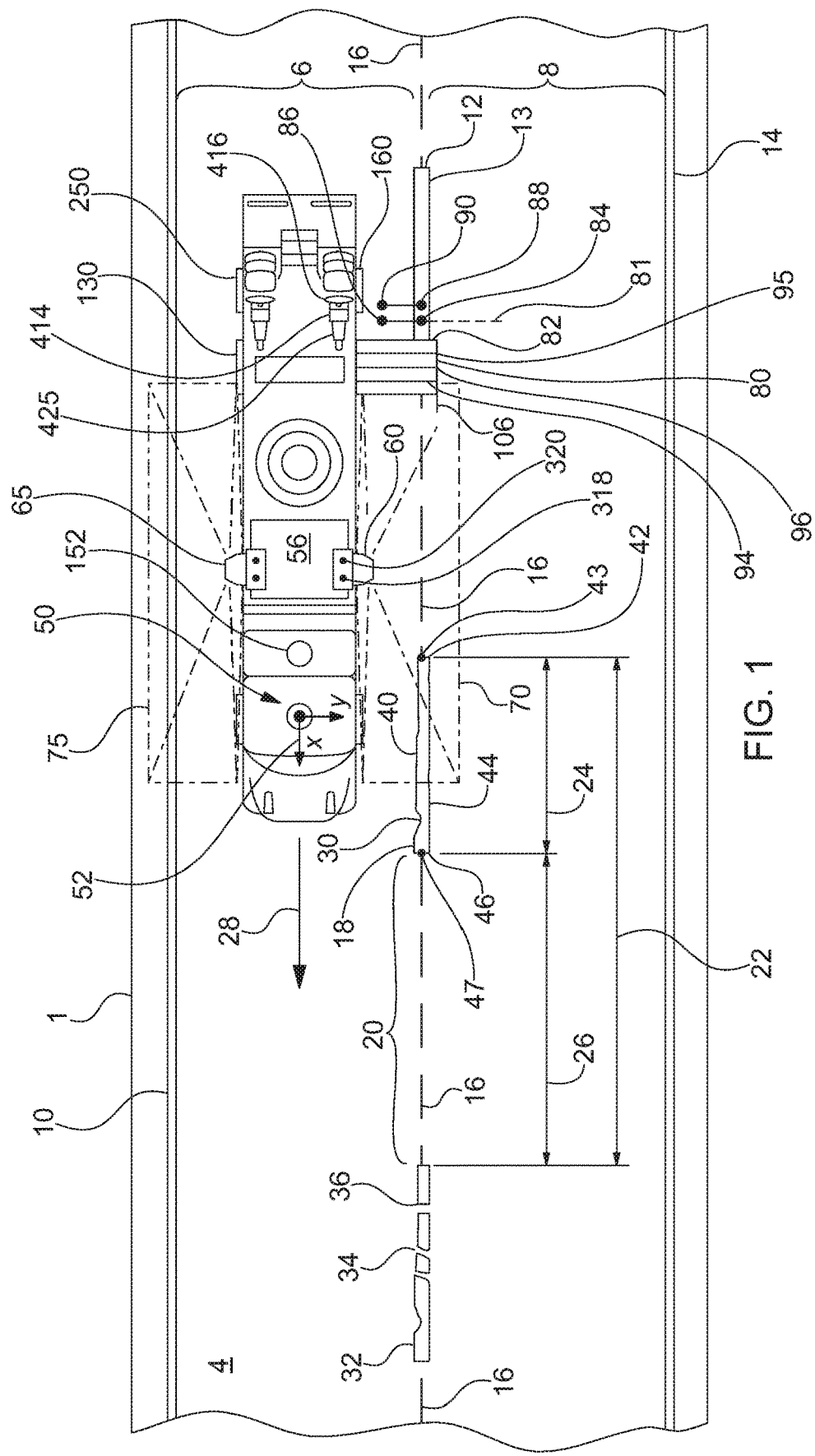
FIG. 1 is a diagrammatic plan view of a vehicle fitted with an exemplary embodiment of the apparatus according to the present invention and moving along a road having a center skip-line roadway mark pattern and roadway edge lines.

Referring now to the drawing, in which like reference numbers refer to like elements throughout the various figures that comprise the drawing, FIG. 1 shows a two-lane roadway 1 having roadway surface 4 and conventional right and left traffic lanes 6 and 8, respectively, as commonly referred to in the United States. Lane 6 is defined by continuous edge line 10 and a single center skip line 12. Lane 8 is defined by continuous edge line 14 and center skip line 12. Lanes 6 and 8 could have vehicle traffic flow in the same or opposite directions.

Center skip line 12 usually follows the longitudinal directed center of the roadway 1. A roadway mark path 16 defines the path which center skip line 12 follows, and the longitudinal center line of center skip line 12 is coincident with roadway mark path 16. Mark path 16 is shown as a dashed line on roadway surface 4, and edge lines 10 and 14 are usually offset a given distance in the lateral direction from roadway mark path 16, and are therefore substantially parallel to center skip line 12. It is understood that roadway mark path 16 is not visible on the roadway surface 4 but only illustrates and indicates the longitudinal center line of center skip line 12. Other roadway marks may be offset from roadway mark path 16.

Usually roadway lane edge lines 10 and 14 are continuous lines, but may have breaks or otherwise segments which are not marked. Roadway traffic exit lanes are good examples of where the edge lines 10 and 14 may have breaks or may otherwise not be parallel with mark path 16. Likewise, center skip line 12 could be a single solid line, or a double solid line, or a combination of these or other lines.

Center skip line 12 comprises a cyclic pattern of roadway line mark segment 18 followed by an unmarked gap segment 20. This mark and gap segments cycle is repeated continuously on roadway surface 4 along roadway mark path 16, but may change depending upon the roadway mark specifications. For example, the center skip line pattern may change to a solid single or double line or even a roadway mark comprising one solid line mark parallel to a skip line, such as a conventional roadway passing mark. The invention is not limited to the particular type of center or edge line patterns, and includes solid single and double line patterns, skip-line patterns, other patterns or various combinations of line patterns.

Center skip line 12 has cyclic length 22 with mark segment 18 having length 24 and gap segment 20 having length 26. Skip line patterns may be noted as two numbers separated by a delimiter, the first number indicating the mark segment length 24 followed by the second number which indicates cyclic length 22. For example, a 15/40 (the delimiter is the "/") skip line pattern defines mark segment 18 length 24 of 15 feet (450 cm) and cyclic length 22 of 40 feet (1,200 cm), yielding a computed gap segment 20 length 26 of 25 feet (750 cm). Many other skip line patterns exist and may include 10/40, etc. Also, skip line patterns may be expressed in metric units (meters).

A conventional paint vehicle 50 having a right-handed Cartesian coordinate system 52 is further shown moving in a forward longitudinal direction 28 within lane 6 and along roadway mark path 16, restriping the roadway mark line segments of center skip line 12. It is understood that the term "vehicle" is given its broadest meaning, including any conveyance, motorized device, or moving piece of mechanical equipment for transporting passengers or apparatus. More specific and preferred examples of vehicles are trucks and road marking machines.

As indicated in FIG. 1, mark segment 18 has a partially worn-away portion 30, while the following mark segment 32 has discontinuous breaks 34 and 36. Other mark segments may have a combination of worn-away portions, breaks, or areas which have had their respective binder material and/or reflective elements removed from the surface of the roadway mark segment. Restriping of the mark segments applies new roadway marking material substantially over each roadway mark segment and applies new roadway mark material (including reflective elements if specified) especially over worn-away portion 30 and breaks 34 and 36, thereby rehabilitating and maintaining the contrast visibility of the mark segments for a given skip line, or over an entire single or double line, or any combination thereof.

Roadway mark segments are usually characterized by rectangular shaped marks defined by near and far longitudinal edge lines, and beginning and ending lateral edge lines. For example, mark segment 18 is substantially rectangular having near longitudinal edge line 40 (i.e., the longitudinal edge line closest to vehicle 50) and far longitudinal edge line 44 (i.e., the longitudinal edge line farthest from vehicle 50), and beginning lateral edge line 42 (i.e., the first lateral edge line approached by vehicle 50 traveling in direction 28) and ending lateral edge line 46 (i.e., the second lateral edge line approached by vehicle 50). The edge lines form a substantially rectangular-shaped boundary of the roadway mark 18. Lateral edge lines 42 and 46 define the beginning and ending lines, respectively, of mark segment 18, and points 43 and 47 define the center points of lateral edge lines 42 and 46, respectively.

Further shown in FIG. 1 are downwardly focused and enclosed imaging systems 60 and 65 mounted on the driver and passenger sides of vehicle 50, respectively. Imaging system 60 is positioned on vehicle 50 to image area 70, and imaging system 65 is positioned to image a similar area 75 on the passenger side of vehicle 50. Enclosed imaging systems 60 and 65 are identical and are more fully disclosed later in this document with reference to FIGS. 6A and 6B.

Figure 2:
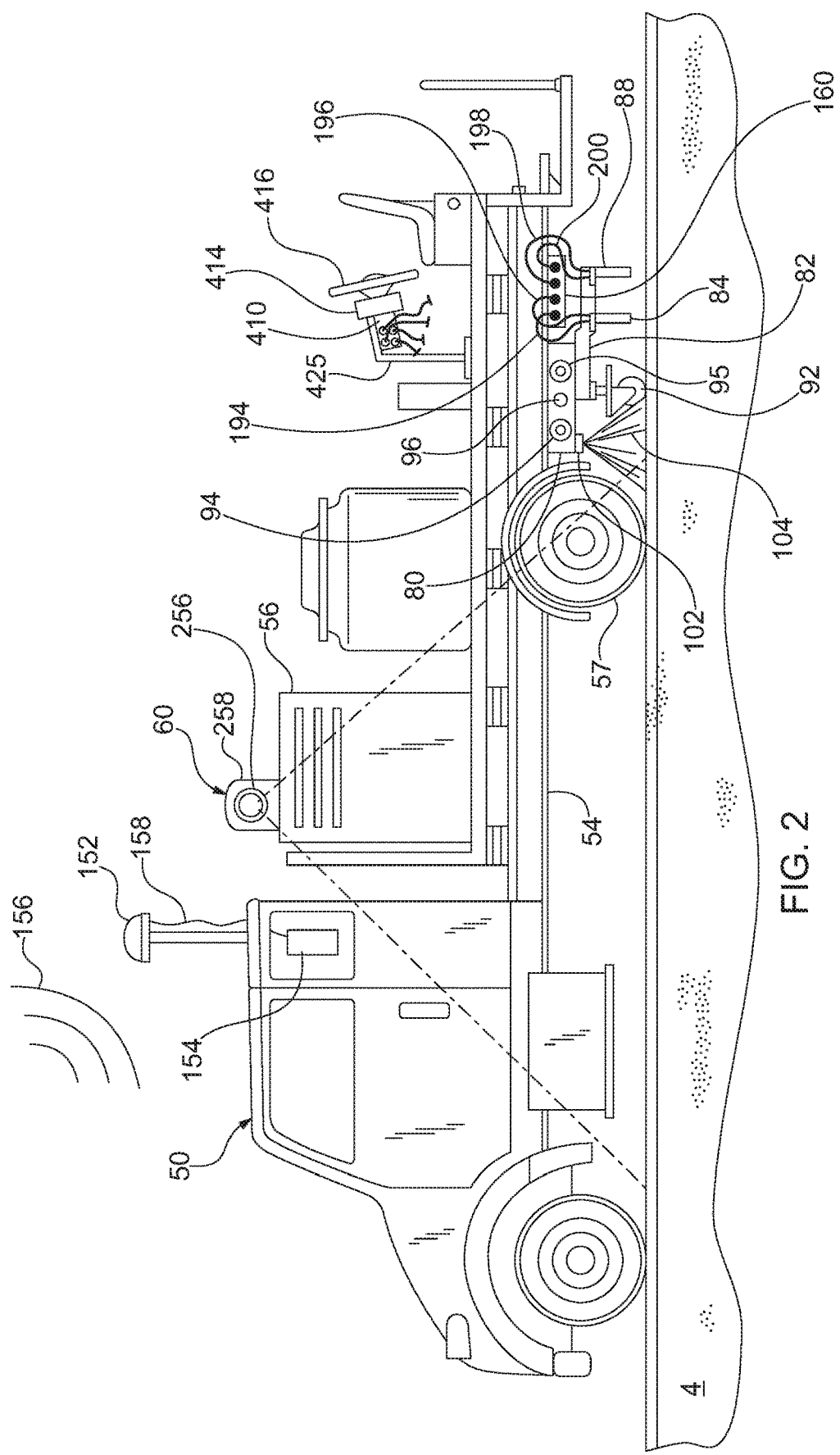
FIG. 2 is a diagrammatic side view of a vehicle fitted with the apparatus according to the present invention, illustrating additional components of the apparatus.

Referring additionally to FIG. 2, the driver's side of vehicle 50 has an attached and laterally moveable conventional paint carriage 80, shown in an extended position away from vehicle 50 and positioned over center skip line 12 (shown in FIG. 1). A paint and bead gun support member 82 is moveably attached (the conventional attachment mechanism is not shown) to carriage 80 and supports outward positioned paint gun 84 and inward positioned paint gun 86 and their respective outward and inward positioned reflective bead guns 88 and 90. A vertical load bearing rotatable wheel 92 is attached to gun support member 82 and is in contact with roadway surface 4. Wheel 92 vertically supports gun support member 82 when carriage 80 is in an extended position away from vehicle 50.

The lateral distance between paint guns 84 and 86 may be manually adjusted to accommodate the restriping of parallel double lines (for example, a solid line parallel to a skip line, usually used to designate an allowed passing zone, or two solid lines, usually used to designate a no passing zone, etc.). In a similar fashion, the lateral distance between reflective bead guns 88 and 90 can be manually adjusted to allow lateral alignment with paint guns 84 and 86, respectively.

Figure 7:
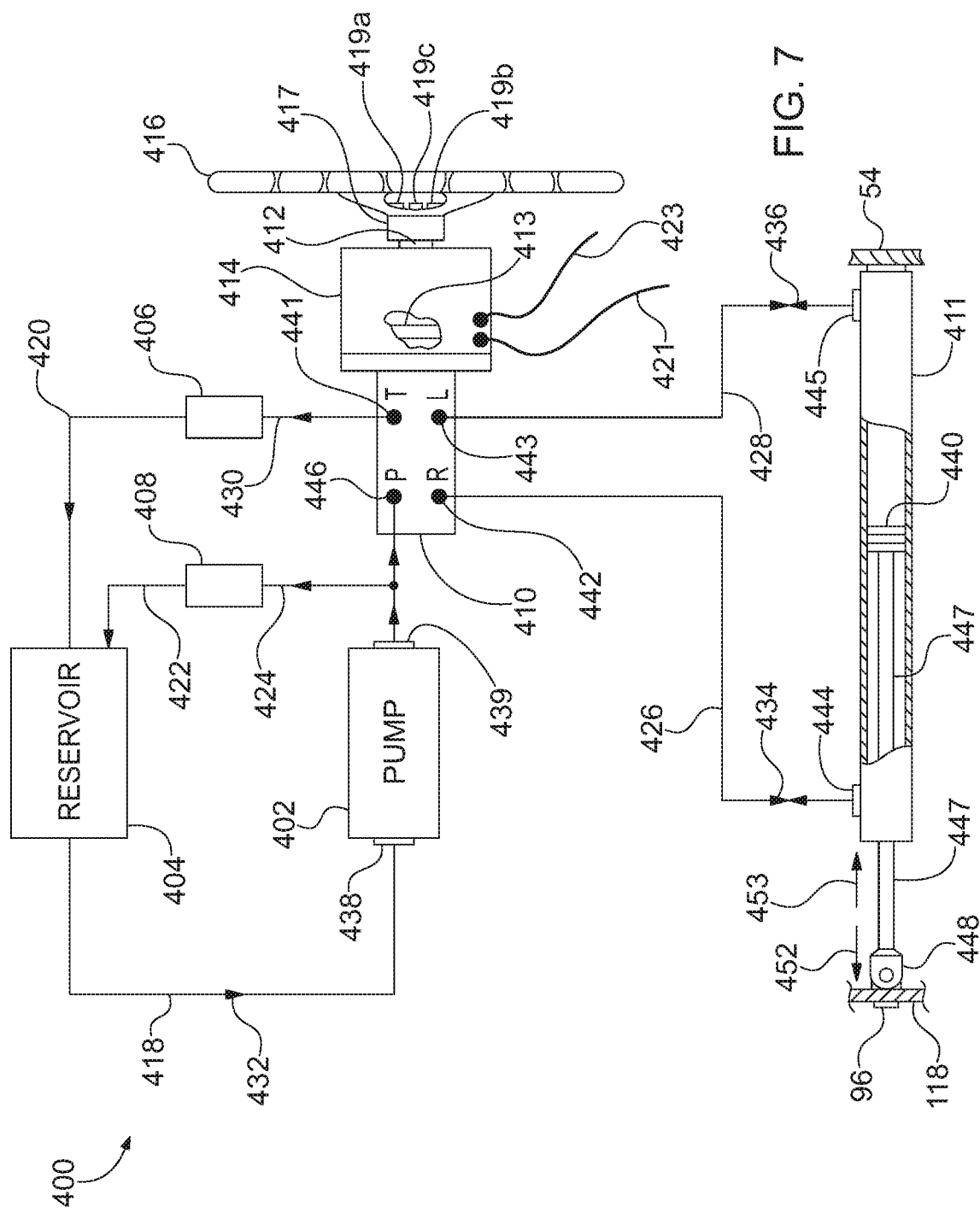
FIG. 7 is a schematic diagram of a conventional and manually operable paint carriage hydraulic control system enhanced with an electric motor for controlling the lateral movement of the paint carriage.

Further attached to carriage 80 are laterally extendible, cylindrically shaped support arms 94 and 95. A hydraulic cylinder 411 having a piston 440 connected to a piston rod 447 (hydraulic cylinder 411, piston 440, and piston rod 447 are shown in FIG. 7) is attached to a frame 54 of vehicle 50 and is positioned between support arms 94 and 95. The distal end of piston rod 447 is attached to the extendible end of carriage 80 at an attachment point 96. Hydraulically powering piston 440 provides the necessary force to laterally extend or retract carriage piston rod 447 (and therefore paint carriage 80) from paint vehicle 50, thereby controlling the positioning of paint guns 84 and 86 and respective bead guns 88 and 90 over a pre-existing roadway mark. As carriage 80 is laterally extended and retracted, the vertical projection of the nozzle movement of the paint guns 84 and 86 onto surface 4 produces a lateral projection line 81 (shown in FIG. 1), which is referenced to coordinate system 52 (i.e., the x-y-z coordinates of line 81 are determined using conventional calibration methods and an equation of line 81 is determined).

Figure 3B:
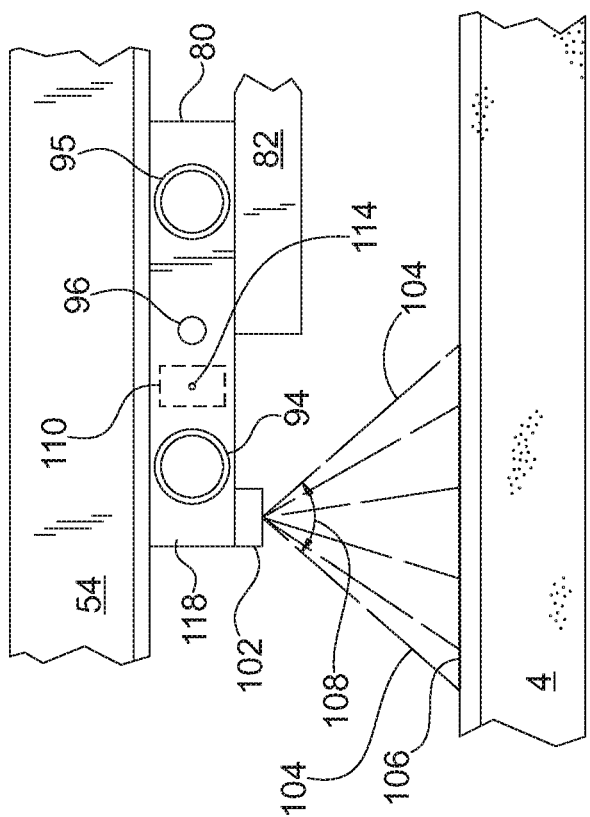
FIG. 3B is a side frontal view of a paint carriage showing a laser line generator projecting a line onto a roadway surface in addition to a draw wire senor mounted onto the frame of a vehicle
Figure 3A:
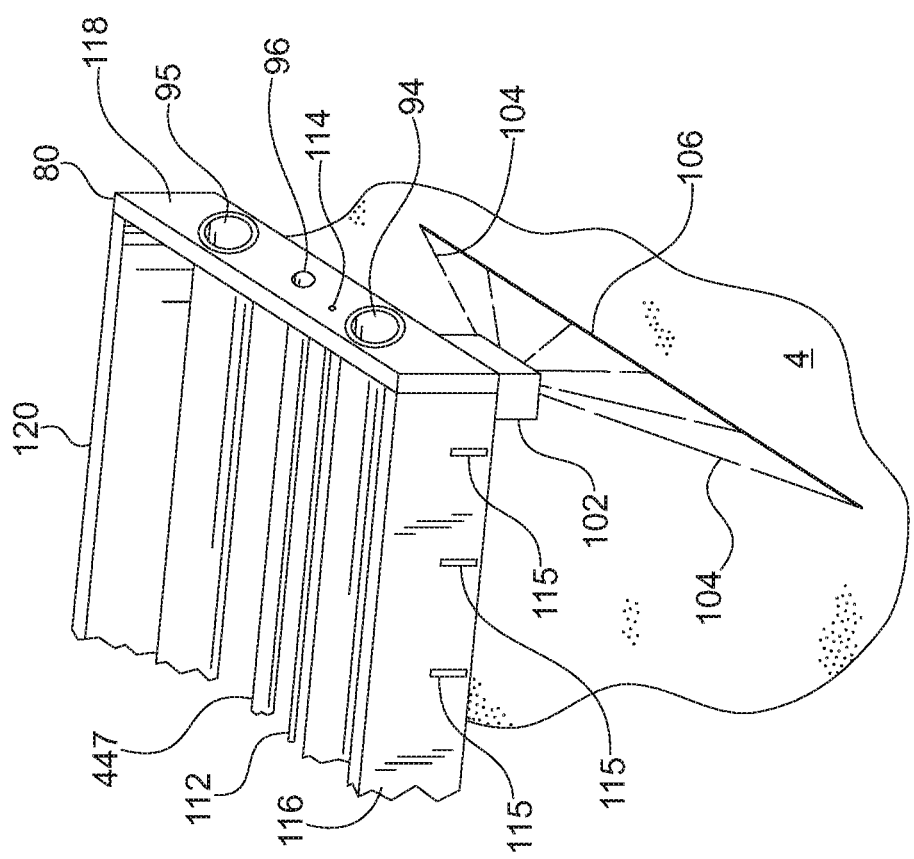
FIG. 3A is a view of a paint carriage having a laser line generator mounted on the carriage frame and projecting a line onto a roadway surface and additionally showing the connection point of a draw wire sensor onto the carriage frame.

Referring now to FIGS. 3A and 3B, a conventional laser line generator 102 is shown mounted underneath the frame (which includes front, side, and rear frame members 116, 118, and 120, respectively) of carriage 80. Laser line generator 102 produces a fanned pattern of laser light 104 downwardly focused onto, and intersecting with, roadway surface 4 thereby producing a line pattern 106. The fanned pattern of laser light 104 is further characterized by a fan angle 108. Line generator 102 may also include infrared and ultra-violet lasers, or other focusable electromagnetic radiation sources. Line pattern 106 is positioned such that it is within area 70 and is imaged by imaging system 60. Imaging system 60 may then determine the lateral position of carriage 80 (imaging system 60 has been previously calibrated as further discussed in reference to FIG. 10), and thus determine the lateral positions of paint guns 84 and 86 and their respective nozzles and also bead guns 88 and 90 (lateral offset(s) adjusted). Imaging system 60 includes a CCD camera 252 having an optical band pass filter 262 which passes the reflected laser light from line pattern 106 (more fully described with reference to FIGS. 6A and 6B).

Thus as carriage 80 moves in a lateral direction inward to and outward from vehicle 50, line pattern 106 also moves giving a visual indication (for a visible laser line generator) of the lateral position of carriage 80 (and which is imaged by camera 252). The lateral positions of the paint guns 84 and 86 (and their respective nozzles) and bead guns 88 and 90 are therefore also visually indicated by line pattern 106 taking into consideration any fixed offsets between the paint and bead guns and laser line pattern 106. Laser line generator 102 may also be moved laterally along the frame of carriage 80 and positioned so that line pattern 106 is laterally aligned with one of the paint guns, for example paint gun 84.

Laser line generator 102 may also be mounted to frame 54 projecting the fanned pattern of laser light 104 first horizontally with respect to surface 4 and then subsequently reflected downward by a mirror mounted on carriage 80 again forming line pattern 106 with surface 4. Carriage 80 may further have reflective ruler markings 115 placed onto front frame member 116 of carriage 80, which may be imaged by imaging system 60 and which then may also indicate the lateral position of carriage 80. Laser line generator 102 may also include a conventional laser pointer projecting a substantially circular "spot" pattern onto roadway surface 4 and within imaged area 70.

Also alternately attached to frame 54 is a conventional draw wire sensor 110 (shown hidden as a dashed outline in FIG. 3B) having a flexible steel cable 112 positioned between cylindrically shaped support arms 94 and 95 and attached to the distal end of carriage 80 at an attachment point 114. Sensor 110 may also determine the relative lateral movement of carriage 80, and therefore the lateral position of paint guns 84 and 86 and their respective nozzles and bead guns 88 and 90, taking again into consideration any fixed offsets between the paint and bead guns and attachment point 114 between the extendable end of steel wire 112 and the side frame member 118 of carriage 80, with respect to frame 54. Other distance-determining transducers may be used to determine the lateral position of carriage 80 with respect to frame 54, all of which may be referenced to coordinate system 52.

A laterally moveable paint carriage 130 identical to carriage 80 is attached to the passenger side of vehicle 50 and is shown in a slightly extended position beyond the passenger's side of vehicle 50 in FIG. 1. Paint carriage 130 further includes a paint and bead gun support member 132 (not shown) moveably attached to carriage 130 and supporting an outward positioned paint gun 134 (not shown) and an inward positioned paint gun 136 (not shown) and their respective outward and inward positioned reflective bead guns 138 and 140 (not shown). A vertical load bearing rotatable wheel 142 (not shown) is attached to gun support member 132 and is in contact with roadway surface 4. Wheel 142 vertically supports gun support member 132 when carriage 130 is in an extended position away from vehicle 50.

Further attached to carriage 130 are laterally extendible cylindrically shaped support arms 144 and 146 (not shown). A hydraulic piston 148 (not shown) is positioned between support arms 144 and 146. The moveable end of hydraulic piston 148 is attached to the side frame member of carriage 130, and the other end of the piston is secured to frame 54 of paint vehicle 50. Hydraulically powering piston 148 provides the necessary force to laterally extend or retract carriage 130 from paint vehicle 50 thereby enabling the positioning of paint guns 134 and 136 along with their respective nozzles and respective bead guns 138 and 140 over a roadway mark.

Carriage 130 further has a laser line generator or laser pointer mounted to its frame for projecting a laser line onto roadway surface 4 within imaged area 75, reflective ruler markings on the front frame member, and a draw wire sensor or other transducers for determining the lateral position of carriage 130.

Imaged area 70 includes any pre-existing roadway 1 center skip line 12 (or any other center line which may include single or double solid, or a combination of a skip and a solid line, or any combination thereof) with vehicle 50 travelling anywhere within lane 6. Similarly imaged area 75 includes any pre-existing roadway 1 edge line 10 with vehicle 50 travelling anywhere within lane 6. Both imaged areas 70 and 75 laterally extend past the full lateral extension of their respective carriages 80 and 130, and also image their respective roadway surface 4 laser line pattern 106 or spot images and/or carriage ruler markings 115.

As shown in FIG. 2, further attached to vehicle 50 is a conventional real time kinematic (RTK) enabled global positioning system (GPS) including an antenna 152 and a GPS receiver 154 mounted within the rear cab of vehicle 50. Antenna 152 receives satellite GPS signals 156. A communication cable 158 electrically connects antenna 152 to receiver 154.

Imaging system 60 may also be mounted over carriage 80 on a fixably swingable mount (i.e., the mount can swing back along the side of vehicle 50 when not required) having a frontal field of view projected forward in the longitudinal direction and so positioned to image area 70 and line pattern 106. Imaging system 65 may be similarly mounted over carriage 130 to image area 75 and its respective laser line pattern. Other locations on vehicle 50 for mounting imaging systems 60 and 65 for imaging areas 70 and 75, respectively, are possible.

Figure 4:
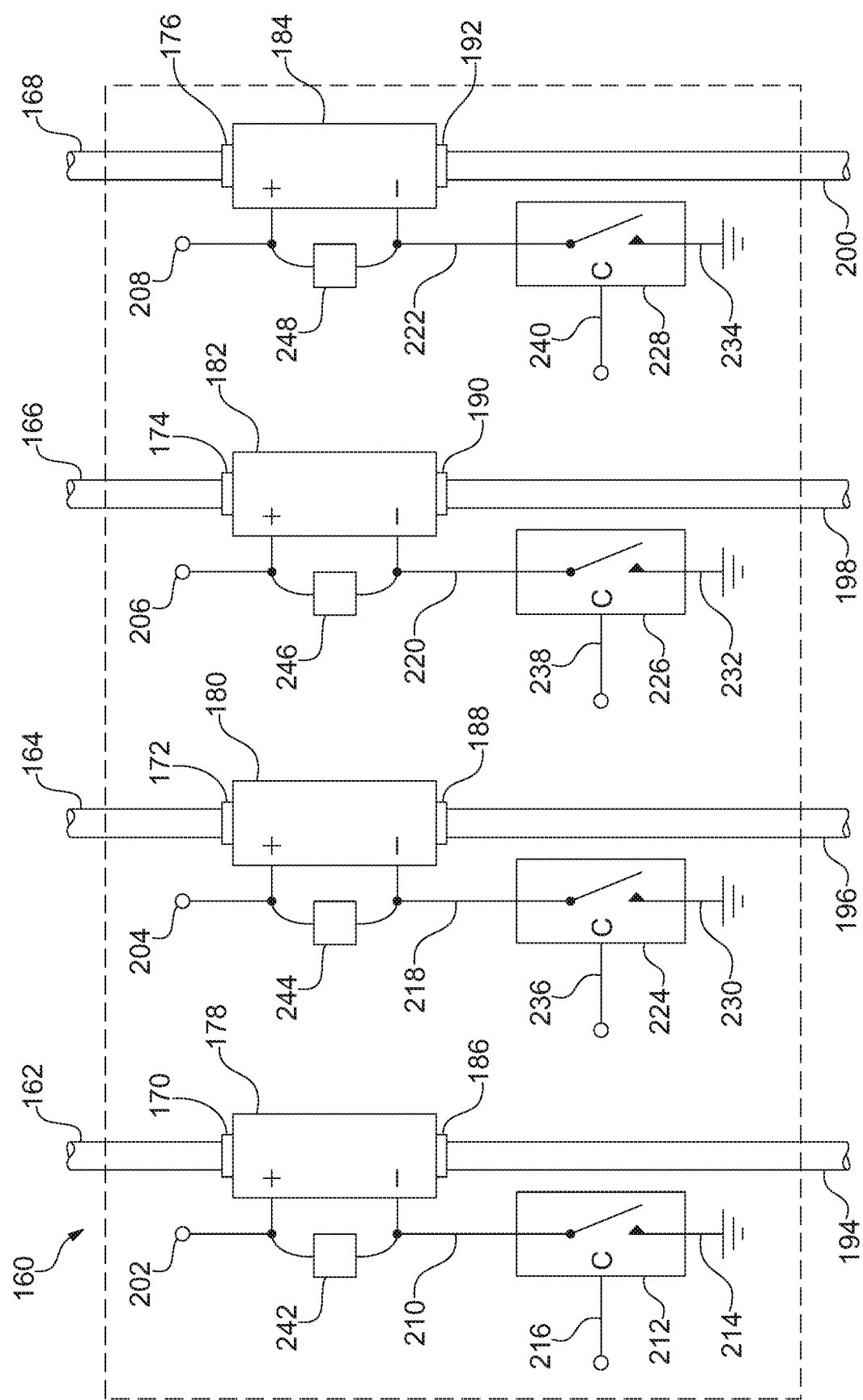
FIG. 4 is a schematic diagram of a conventional roadway mark material pressurized air control system.

Referring now to FIG. 4, a conventional roadway mark material pressurized air control system 160 is shown and is further attached to the driver's side of vehicle 50 in close proximity to carriage 80 and comprises air input conduits 162, 164, 166, and 168. The far ends of conduits 162, 164, 166, and 168 are in fluid communication with a compressed air reservoir (not shown). The near ends of conduits 162, 164, 166, and 168 are further connected to inlet ports 170, 172, 174, and 176 of conventional solenoid valves 178, 180, 182, and 184, respectively. The solenoid valves control pressurized air flow to their respective conventional paint and bead guns.

Outlet ports 186, 188, 190, and 192 of valves 178, 180, 182, and 184 connect to the near ends of flexible conduits 194, 196, 198, and 200, respectively. The far ends of flexible conduits 194 and 196 are connected to paint guns 84 and 86, respectively, and the far ends of flexible conduits 198 and 200 are connected to bead dispensing guns 88 and 90, respectively.

In response to pressurized air flow, the respective paint and bead guns open permitting the pressurized paint and/or beads to be forcibly dispensed onto roadway surface 4. The flexible conduits allow delivery of air to the paint and bead guns as the carriage laterally moves to align the guns (and their respective nozzles) with the pre-existing roadway mark. The material supply lines to the individual paint and bead guns are not shown to avoid clutter and add clarity in FIG. 1.

Solenoid valves 178, 180, 182, and 184 each have separate positive and negative electrical connections for supplying electrical energy to activate their respective valve switching solenoids. Fused electrical power is supplied to the positive terminals of valves 178, 180, 182, and 184 via terminals 202, 204, 206, and 208, respectively. Fused electrical power to operate the valve solenoids may be derived from a 12-volt battery (not shown) of vehicle 50.

The negative terminal of valve 178 connects via a line 210 to one terminal of an electronically controlled switch 212. The other end of switch 212 connects to ground via a line 214.

The on-off state of switch 212 is controlled by an externally generated electrical control signal which flows to the control terminal C via a control line 216. In a similar fashion, the negative terminal of valves 180, 182, and 184 connect via lines 218, 220, and 222 to one terminal of electronically controlled switches 224, 226, and 228, respectively. The other ends of switches 224, 226, and 228 connect to ground via lines 230, 232, and 234, respectively. Similarly, the on-off state of switches 224, 226, and 228 are controlled by an externally generated electrical signal which flows to their respective control terminals C via control lines 236, 238, and 240, respectively.

Figure 5:
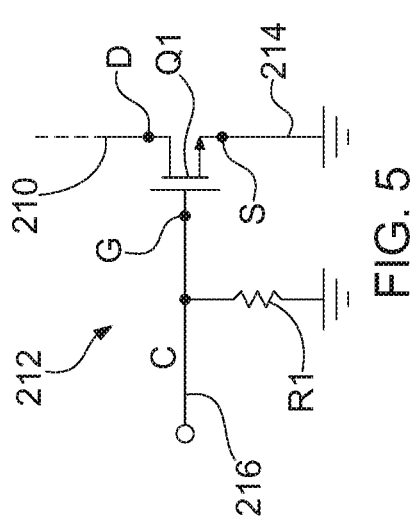
FIG. 5 is a schematic diagram of an air valve control switch implemented using a conventional N-channel enhancement MOSFET transistor.

FIG. 5 illustrates switch 212 implemented using a conventional N-channel enhancement metal-oxide-semiconductor field-effect transistor (MOSFET) Q1 (having gate G, drain D, and source S electrical terminals). The MOSFET is a type of transistor used for amplifying or switching electronic signals. A resistor R1 connects to the gate terminal of Q1 and maintains the gate of Q1 at ground potential (and therefore Q1 is in the off state) until a positive voltage control signal is externally applied onto line 216. Externally applying a positive signal voltage to control terminal C switches Q1 to the conducting on state. This in effect short circuits the drain D and source S terminals allowing current flow from terminal 202 through the solenoid of solenoid valve 178 to ground, thereby activating the valve and enabling pressurized air to flow from conduit 162 to flexible conduit 194 and into paint gun 84. Switches 224, 226, and 228 are controlled and operated in a similar fashion. It is therefore understood that solenoid valves 178, 180, 182, and 184 are individually controlled by the electrical signals flowing to switches 212, 224, 226, and 228. Further, switches 212, 224, 226, and 228 may be implemented with conventional N-P-N bipolar transistors, or other electrically controlled switches such as relays. A computer 702 (shown in FIGS. 9 and 10) directs the respective control signal flow to switches 212, 224, 226, and 228, and therefore can independently control the flow of paint and/or beads via their respective guns.

In addition, each valve 178, 180, 182, and 184 has protective circuitry 242, 244, 246, and 248 (not shown), respectively. The protective circuitry minimizes any generated fly back voltages induced across the respective positive and negative solenoid voltage terminals during solenoid initiated valve switching.

A similarly constructed roadway mark material pressurized air control system 250 (shown in FIG. 1) is mounted on the passenger side of vehicle 50 and controls the distribution of pressurized air to the respective paint and bead guns located on carriage 130. Air, paint, and bead conduits or hoses are not shown for clarity in FIG. 1, and only air conduits 194, 196, 198, and 200 to carriage 80 are shown in FIG. 2.

A manufacturer of commonly used solenoid valves for controlling the distribution of pressurized air to control the flow of paint and/or beads through their respective guns is MAC Valves, Inc. located in Wixom, Mich.

Figure 6A:
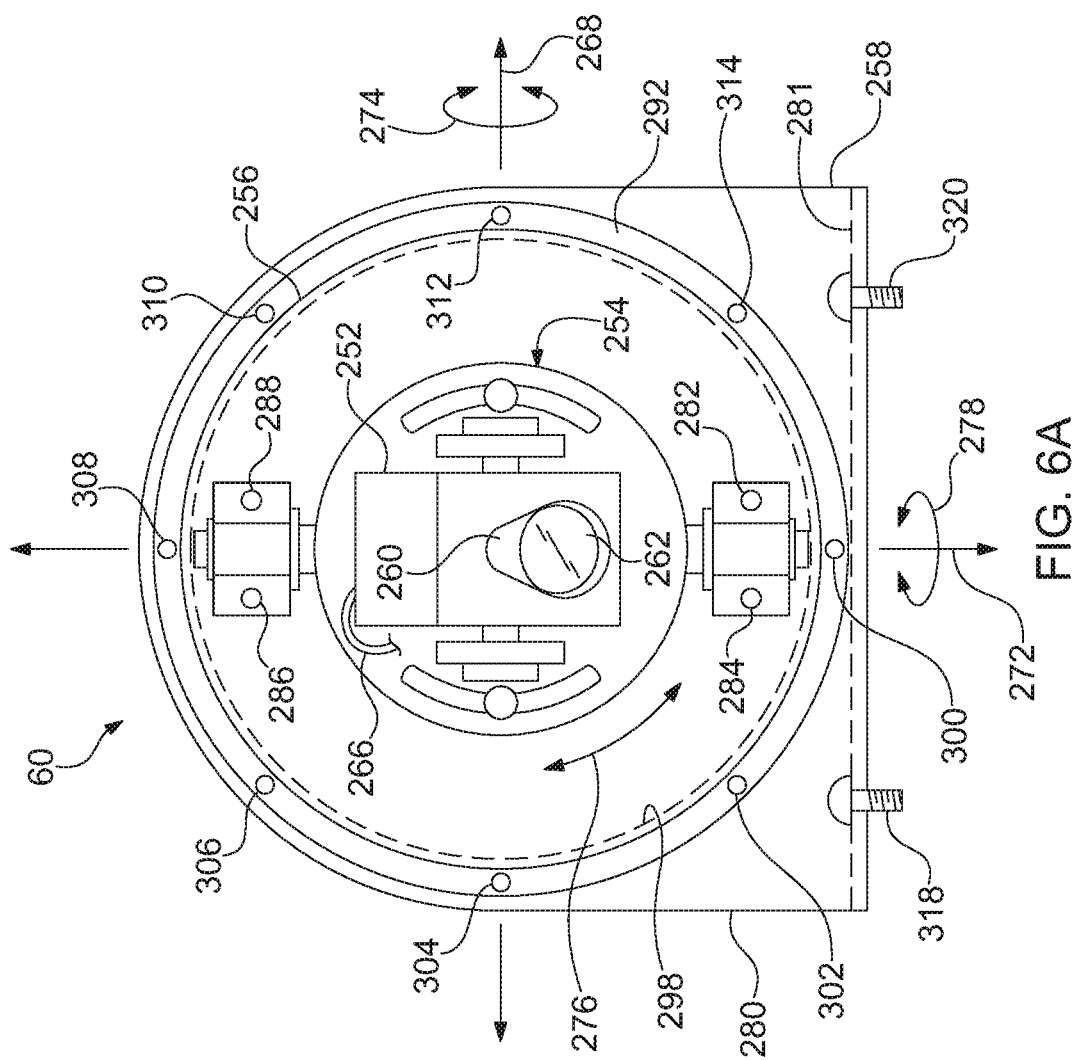
FIG. 6A is a front view of an imaging system of the present invention showing the imager affixed to a 3-axis rotational mount.
Figure 6B:
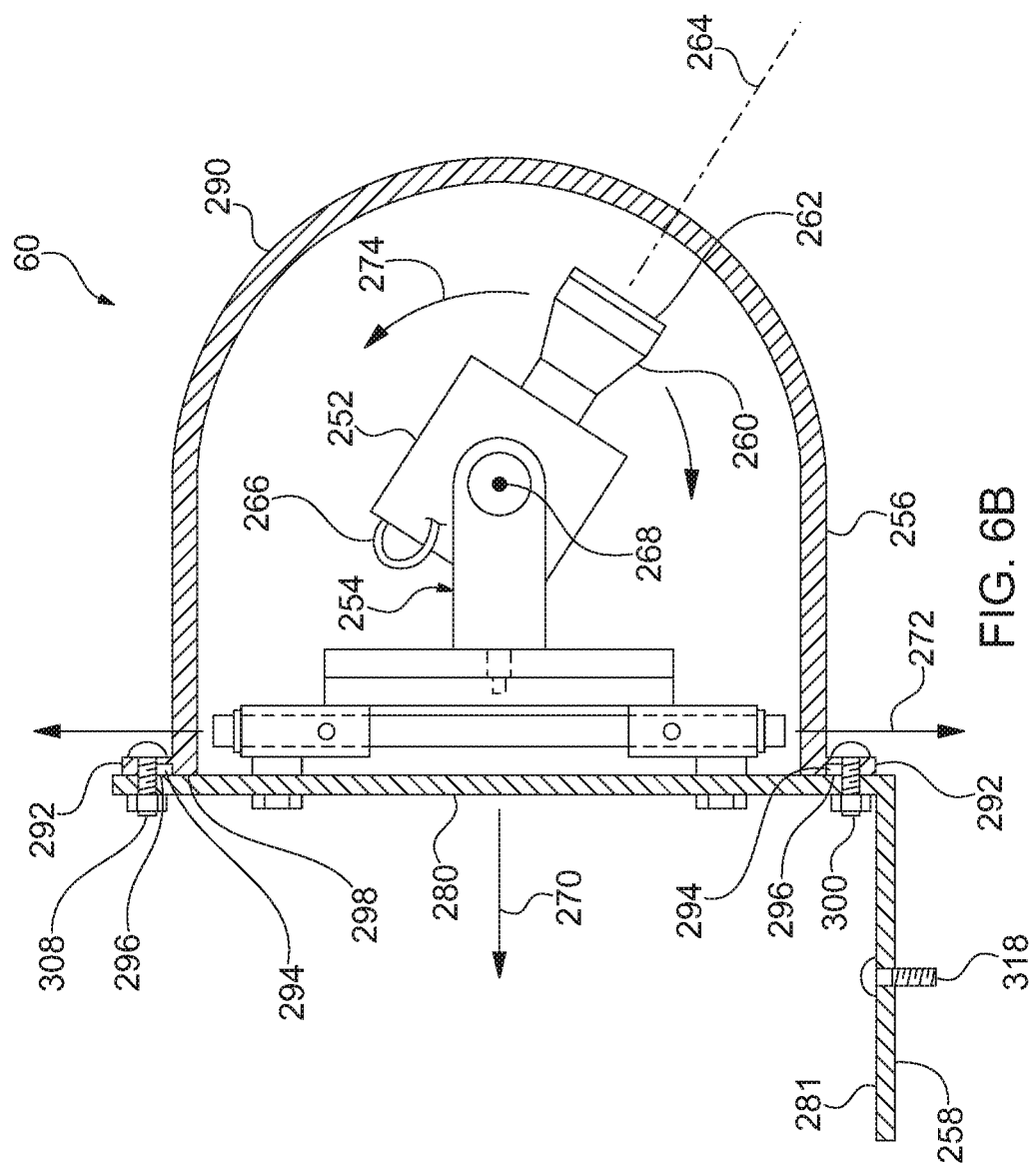
FIG. 6B is a side view of the imaging system of FIG. 5A specifically illustrating a protective semi-hemispherical Plexiglas protective globe and mounting bracket.

Referring now to FIG. 6A and FIG. 6B, imaging system 60 comprises camera 252, a 3-axis adjustable mount 254, a protective Plexiglas globe 256, and a mounting angle bracket 258. Camera 252 is a conventional CCD imager or camera having a lens 260, optical filter 262, and an optical axis 264. Power, data, and control signals communicate with camera 252 via a local bus 266. Camera 252 is further depicted in FIG. 9 along with the above-listed references.

Mount 254 enables camera 252 to be independently rotated about the three axes 268, 270, and 272 in directions 274, 276, and 278, respectively, which enables camera 252 to be spatially positioned to image area 70. Mount 254 is more fully disclosed in the patent applications referenced above. Mount 254 is further affixed to a vertical leg 280 of angle bracket 258 via conventional bolts 282, 284, 286, and 288.

Plexiglas globe 256 encloses both camera 252 and mount 254 and further has a distal hemispherical surface 290 and proximal mounting lip 292. Lip 292 has a rectangular-shaped groove 294 for accepting an O-ring 296 and additionally provides surface area 298 for mounting globe 256, via circumferentially arrayed conventional bolts 300, 302, 304, 306, 308, 310, 312, and 314, onto vertical leg 280 of bracket 258. The horizontal leg 281 of right angle bracket 258 is affixed to the top surface of a compressor enclosure 56 (see FIG. 1 and FIG. 2) via mounting bolts 318 and 320.

Imaging system 65 is identical to imaging system 60, having a camera or imager 330, a 3-axis adjustable mount 332, a protective Plexiglas globe 334, and an angle bracket 336 (all not shown, including the parts of those components). Imager 330 is identical to imager or camera 252 having a lens element 338, an optical filter 340, and an optical axis 342. Power, data, and control signals communicate with imager 330 via an electrical cable 344 (all not shown).

Referring now to FIG. 7, an hydraulic steering system 400 for controlling the lateral movement of carriage 80 is shown and consists of an hydraulic pump 402, an hydraulic fluid reservoir 404, an hydraulic fluid filter 406, a pressure relief valve 408, an hydraulic steering control unit 410, an hydraulically operated cylinder 411, and a conventional steering wheel 416. An electric motor 414 is also shown. Pump 402, reservoir 404, filter 406, relief valve 408, steering control unit 410, and cylinder 411 are in fluid communication with each other via conduits 418, 420, 422, 424, 426, 428, and 430. One direction hydraulic fluid flow is indicated by single-headed arrows (for example, single headed arrow 432) while doubly connected headed arrows indicate possible hydraulic flow in both directions (for example, doubly connected headed arrows 434 and 436). A manufacturer of steering control units is Eaton Corporation of Beachwood, Ohio.

A splined shaft 415 (not shown) of steering control unit 410 is axially aligned with and is attached to a shaft 412 of electric motor 414 via a connecting hub 417. Steering wheel 416 is axially aligned with and is also attached to shaft 412 of electric motor 414 via hub 417 with conventional circumferentially mounted bolts 419a, 419b, and 419c. Internal to electric motor 414 is a programmable motor controller 413 which externally communicates via a communication bus or cable 421 with computer 702 (shown in FIG. 9), and may be programmed by computer 702 via signals sent onto cable 421 to control the rotational position, velocity, or torque of shaft 412, and therefore splined shaft 415 of steering control unit 410. Electrical power is supplied to motor 414 via a power cable 423, and may be derived from the 12-volt battery of vehicle 50. Motor 414 may be a conventional direct drive permanent magnet synchronous motor (PMSM), having high torque and low operational rotational velocity. Motor 414 is further adapted to be easily installed and retrofitted onto the steering control unit 410 without requiring special modifications to either steering wheel 416, steering control unit 410, or a support stand 425 (support stand is shown in FIGS. 1 and 2).

Reservoir 404 connects to the inlet port 438 of pump 402 via conduit 418. Outlet port 439 of pump 402 connects to the pressure (P) port 446 of steering control unit 410 and the input port of relief valve 408 via conduit 424. The output port of relief valve 408 connects to reservoir 404 via conduit 422. The tank (T) port 441 of steering control unit 410 connects to the inlet port of filter 406 via conduit 430. The output port of filter 406 connects to reservoir 404 via conduit 420. The right port (R) 442 of steering unit 410 connects to the port 444 of cylinder 411 via conduit 426, and the left port (L) 443 of steering unit 410 connects to the port 445 of cylinder 411 via conduit 428.

Cylinder 411 has piston 440 with connected piston rod 447 which extends and retracts in directions 452 and 453, respectively, in response to hydraulic fluid flow in conduits 426 and 428. The proximal end of piston rod 447 connects to piston 440 and the distal end of rod 447 attaches to the inside of side frame member 118 of carriage 80 at attachment point 96 using a clevis fastener 448. Thus, hydraulically extending rod 447 laterally extends carriage 80 and hydraulically retracting rod 447 laterally retracts carriage 80.

A clockwise rotation of splined shaft 415 of steering control unit 410, either produced automatically by motor 414 or manually with steering wheel 416, causes a pressure differential between the surface areas of piston 440. This pressure differential forces piston 440, and therefore piston rod 447, to move into hydraulic cylinder 411 in direction 453, thereby laterally retracting carriage 80 into the driver's side of vehicle 50.

A counter clockwise rotation of the splined shaft 415 of steering control unit 410, either produced automatically by motor 414 or manually with steering wheel 416, causes a pressure differential between the surface areas of piston 440. This pressure differential forces piston 440, and therefore piston rod 447, to extend outwardly from hydraulic cylinder 411 in direction 452, thereby laterally extending carriage 80 outwardly from the driver's side of vehicle 50.

It is therefore understood that computer 702 may communicate with motor 414 via commands sent to controller 413 via cable 421, and therefore may control the lateral position of carriage 80. Electrically disengaging motor 414 (defined as allowing the free rotation of shaft 412) by computer 702 allows spline shaft 415 of steering control unit 410 to be manually rotated via steering wheel 416 without any interference or assistance from motor 414. With a disengaged motor 414, the lateral position of carriage 80 may be manually controlled as if motor 414 had not been inserted into hydraulic steering system 400.

Hydraulic steering system 450 (not shown) controls the lateral movement of carriage 130. Hydraulic steering system 450 is identical in every respect to hydraulic system 400 except that the hydraulic connections are reversed on the hydraulic cylinder so that a counter clockwise rotation of the steering wheel (or motor) retracts, and a clockwise rotation of the steering wheel (or motor), extends carriage 130. Other hydraulic systems and other configurations are possible for controlling the movement of carriages 80 and 130.

Figure 8:
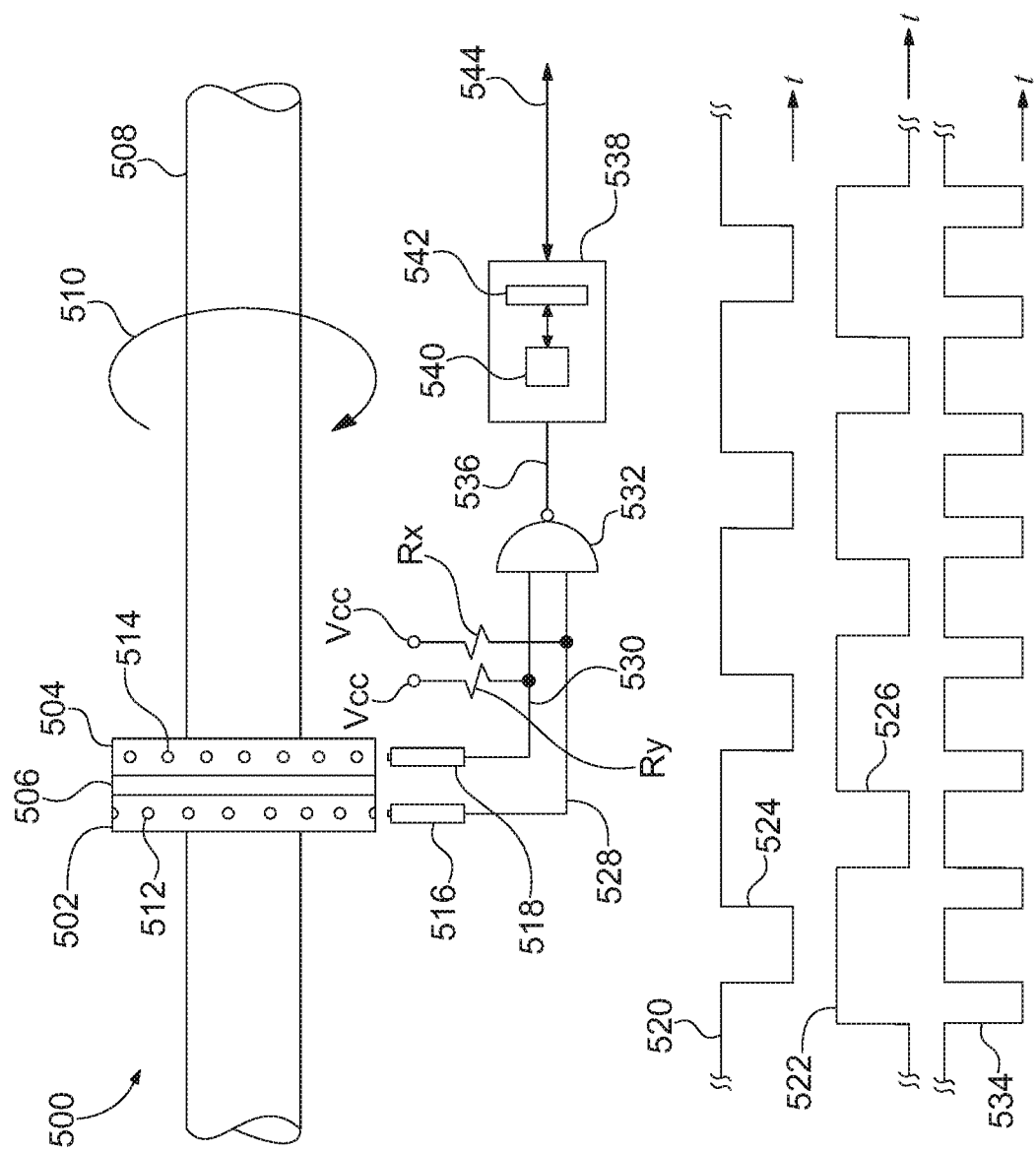
FIG. 8 is a schematic diagram of a drive shaft positional sensor for a vehicle.

Referring to FIG. 8, a drive shaft positional sensor 500 is shown and includes conventional non-magnetic split shaft collars 502 and 504 separated from one another by a non-magnetic split spacer 506. The halves of shaft collars 502 and 504 along with split spacer 506 are conventionally clamped around a drive shaft 508 of vehicle 50 with recessed screws (not shown).

Drive shaft 508 is further connected to a conventional rear axle differential which in turn drives the rear axle of vehicle 50. Further attached to the rear axle are driver and passenger side rear wheels 57 (see FIG. 2) and 58 (not shown), respectively, of vehicle 50. The rear axle differential, rear axle, and rear wheel 58 are not shown. Drive shaft 508 rotates the rear axle and hence rotates the rear wheels 57 and 58 of vehicle 50. A rotation (or part thereof) of drive shaft 508 therefore corresponds to the longitudinal distance travelled by vehicle 50 via rear wheel 57 rotation.

As drive shaft 508 rotates in the direction 510, collars 502 and 504 along with spacer 506 also rotate in the same direction 510. Cylindrically shaped permanent magnets 512 and 514 are imbedded and potted within, and are radially arrayed around the outer circumference of, collars 502 and 504, respectively. Further, collar 504 is rotatably displaced from collar 502 so that magnets 514 are radially aligned between magnets 512. A manufacturer of these types of magnetic shaft collars is Electro-Sensors, Inc. of Minneroattonka, Minn. 55343.

Conventional Hall-effect sensors 516 and 518 are positioned in close proximity to the outer circumference of shaft collars 502 and 504, respectively, and are attached to the body frame 54 of vehicle 50 by conventional mounts (not shown). Sensors 516 and 518 detect the changing magnetic flux produced by magnets 512 and 514, respectively, as collars 502 and 504 rotate in response to rotation in the direction 510 of drive shaft 508.

In response to the changing magnet flux, sensors 516 and 518 produce active low signals 520 and 522 (represented by pulses 524 and 526, respectively, illustrated along a time or "t" axis in FIG. 8) onto lines 528 and 530, respectively, which then flow into the inputs of a conventional NAND gate 532. The outputs of each of the Hall-effect sensors 516 and 518 are connected to external pull-up resistors Rx and Ry, respectively. The pull-up resistors Rx and Ry may also be internal to the Hall-effect sensors 516 and 518. The other ends of resistors Rx and Ry are connected to DC voltage Vcc, which may be the +12-volt battery of vehicle 50. In response to input signals 520 and 522, NAND gate 532 produces an active high output signal 534. Output signal 534 from NAND gate 532 flows onto a line 536 and is an input signal to bus interface circuit 538. NAND gate 532 is shown separately for clarity but may be directly incorporated into interface circuit 538.

Signal 534 is composed of the signals from shaft collars 502 and 504. Having collar 504 rotatably displaced from collar 502 allows twice as many magnetic pulses than that possible from just one collar given a particular shaft collar size and number of magnets per collar. Having additional collar 504 increases the angular resolution of drive shaft 508 rotation per pulse. More collars rotatably displaced from one another may be added to increase the angular resolution of drive shaft 508.

For example, if collar 502 has a total of 36 magnets then each active low pulse 524 corresponds to an angular rotation resolution of 10 degrees. With second collar 504 also having 36 magnets and rotatably displaced so that magnets 514 are aligned between magnets 512 of collar 502, a second non-interfering active low pulse 526 is produced between pulses 524, in effect giving an angular rotation resolution of 5 degrees. Therefore, each pulse of signal 534 corresponds to a known angular rotation of drive shaft 508 and therefore a known angular rotation of rear wheel 57.

The longitudinal distance travelled (or the longitudinal distance that will be travelled) by vehicle 50 is then easily determined by counting the number of pulses of signal 534 and multiplying this number by the distance travelled per pulse of signal 534. This distance travelled per pulse value in the past was prone to a multitude of errors as previously mentioned in the background section of this document, and is greatly diminished according to the preferred embodiment of this invention.

Interface circuit 538 may incorporate a conventional microprocessor 540 in bi-directional communication with bus interface circuitry 542. Interface circuitry 542 handles all bi-directional communication to and from local bus 544 to microprocessor 540. Microprocessor 540 may input signal 534 from line 536 and be programmed by computer 702 to perform computational tasks such as counting a certain number of pulses of signal 534 over a particular time interval via a conventional gating signal. For example, computer 702 may communicate to interface circuit 538 a "start count" command which would instruct circuit 538 to begin counting the pulses of signal 534, and then communicate to interface circuit 538 a "stop count" command which would instruct circuit 538 to stop counting the pulses of signal 534. Computer 702 may then request the total pulse count of signal 534 which occurred between the "start count" and "stop count" commands from circuit 538, whereby circuit 538 would send the total pulse count back to computer 702 via local bus 544, or the pulse count of signal 534 may be synchronously or asynchronously sent to computer 702.

Bus interface circuitry 542 conditions microprocessor 540 signals intended to be sent onto bus 544 to be compatible with the chosen bus 544 specification, and conditions signals received from bus 544 intended to be sent to microprocessor 540 to be compatible with the signal specifications of microprocessor 540. Bus 544 may include, for example, conventional CANopen or EIA-485 (formally referred to as RS-485) communication protocol specifications. Thus, interface circuitry 542 is in bi-directional communication with computer 702 (and other components shown in FIG. 9) via local bus 544, and can be programmed by computer 702 to perform computational tasks and further synchronously or asynchronously communicates the results of these tasks back to computer 702 or other system elements (shown in FIG. 9).

Figure 9:
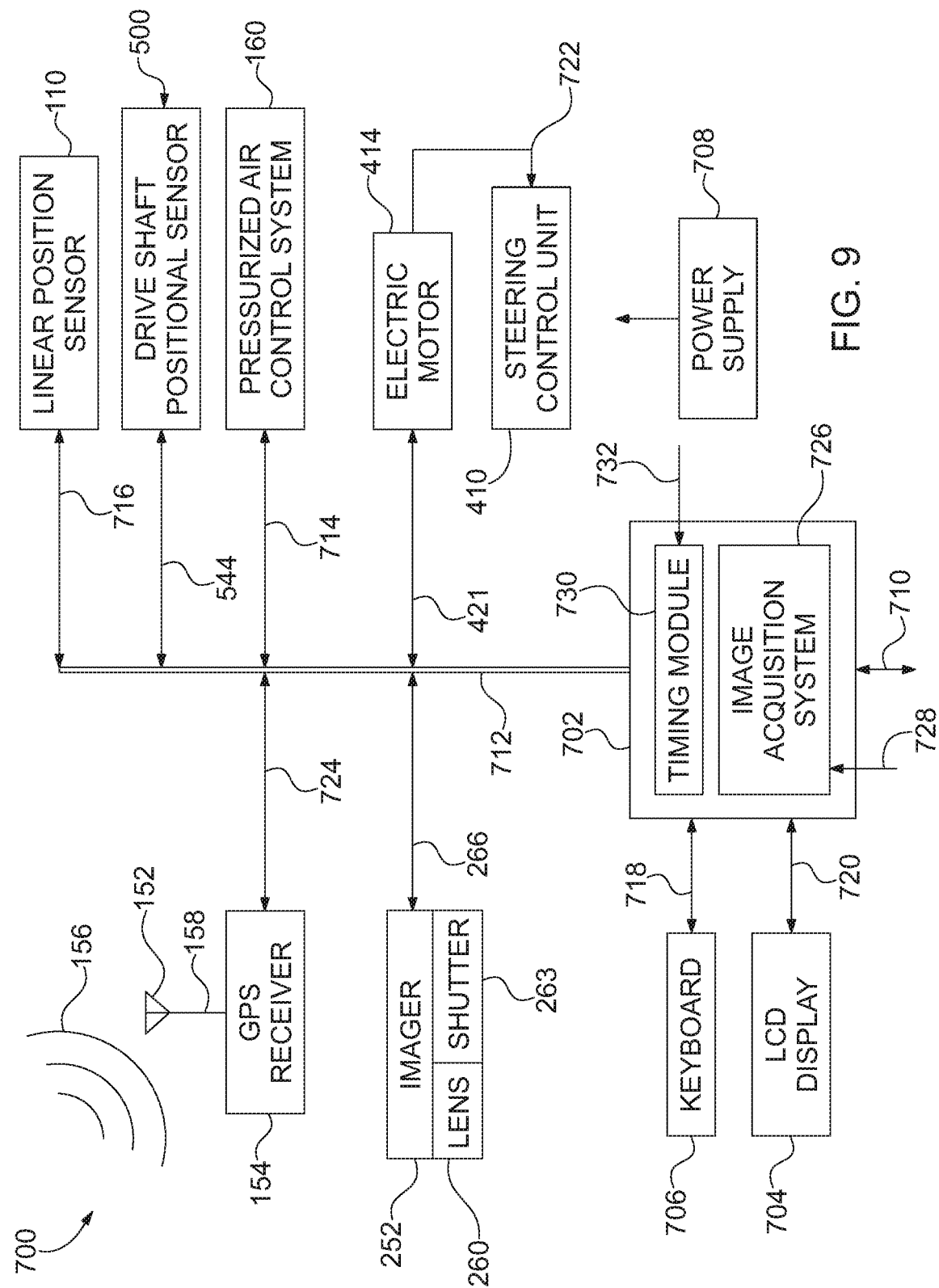
FIG. 9 is a schematic block diagram of a machine vision based control system of the preferred embodiment of the invention.

Referring now to FIG. 9, a machine vision based control system 700 for carriage 80 is shown and includes computer 702, an LCD display 704, a keyboard 706, imager or camera 252, first GPS receiver 154, pressurized air control system 160, electric motor 414, steering control unit 410 (part of hydraulic steering system 400), linear position sensor 110, drive shaft position sensor 500, and a power supply 708. An identical machine vision computer control system 750 controls carriage 130 but is not shown, except that system 750 will not include a GPS receiver (only one RTK enabled GPS receiver 154 and GPS antenna 152 are shown for vehicle 50) or a drive shaft positional encoder or sensor 500 (only one drive shaft positional encoder or sensor 500 is required for vehicle 50). Computer 702 is in bidirectional communication with a similar computer 752 (not shown) of identical machine vision based control system 750 via a bi-directional bus 710. Alternately, the tasks performed by computer 752 may be managed entirely by computer 702.

Computer 702 is in bi-directional communication (i.e., sends and receives data) with and among various components, including GPS receiver 154, camera 252, pressurized air control system 160, electric motor 414, drive shaft positional sensor 500, and linear positional sensor (draw wire sensor) 110 via master bus 712 and local busses 724, 266, 714, 421, 544, and 716, respectively, and each component is in bi-directional communication with each other.

Master bus 712 may be composed of a number of different individual local busses, each individual local bus having different electrical and mechanical specifications supporting their respective communication specifications. For example, local bus 266 may be a camera link compatible bus and local bus 421 may be CANopen compatible bus, and when grouped or bundled together form part of master bus 712. If the tasks performed by computer 752 are replaced entirely by computer 702, master bus 712 would be expanded to include the individual local buses of the remaining components of computer control system 750.

Keyboard 706 and liquid crystal (or similar) display 704 are conventional computer peripherals and are connected to computer 702 via bidirectional universal serial buses (USB) 718 and 720, respectively. Keyboard 706 allows an operator to enter alpha-numeric and other data into computer 702, and display 704 displays information from computer 702 for viewing by the operator. Display 704 may also be a conventional "touch" display allowing the operator to both view information and enter data by selectively touching areas displayed on the display 704, similar to the displays used on "smart" cell phones such as the Apple 6 phone. In addition, a conventional computer-compatible mouse and joystick are also provided (not shown) for entering data into computer 702 by the operator.

Power supply 708 supplies electrical power to computer 702, camera 252, GPS receiver 154, linear positional sensor 110, and drive shaft positional sensor 500 and may use the 12-volt battery of vehicle 50 as its primary power source. Pressurized air control system 160 and motor 414 may be powered directly from the 12-volt battery of vehicle 50 or may be alternately powered by power supply 708. System 750 may have a dedicated power supply 762 (not shown) similar to power supply 708 which supplies electrical power to its respective components or, alternately, power supply 708 may be sized accordingly to power both system 700 and system 750 components.

Also shown in FIG. 9 is steering control unit 410 of FIG. 7, which responds to both steering wheel 416 rotation and more specifically to the controlled shaft 412 rotation of electric motor 414, which is represented by arrow 722.

First GPS antenna 152 is electrically in communication with GPS receiver 154 via electrical cable 158. Antenna 152 and receiver 154 are adapted to receive conventional GPS signals 156 from any GPS satellite system (for example, the Russians' GLONOSS system or the United States' Global Positioning System), or from a GPS-pseudolite system. In addition, receiver 154 is further adapted to use RTK data via a separate communication channel (not shown) to compliment the satellite-derived GPS data thereby increasing the GPS positional accuracy of vehicle 50.

The single antenna/receiver GPS system shown in FIG. 9 may be expanded to provide a conventionally known GPS-based truck coordinate system (referenced to the conventional Earth Centered Earth Fixed (ECEF) coordinate system) having two additional GPS antennas and receivers. The second GPS antenna is longitudinally aligned with (along the x-axis of coordinate system 52), and rearward of, the first GPS antenna. The third GPS antenna is located laterally across (along the y-axis of coordinate system 52) from the second GPS antenna. With a vehicle 50 based expanded GPS system, the ECEF coordinates of vehicle 50 and any fixed or moveable parts thereof may be determined (offset corrected) and their absolute ECEF position determined. An example of a GPS receiver is model BX-982 manufactured by Trimble Navigation Limited of Sunnyvale, Calif.

GPS receiver 154 decodes signals received by antenna 152 and uses RTK data (via the separate communication channel) to determine the geographical location (longitude, latitude, and altitude, or the ECEF position) of antenna 152. The location of antenna 152 is known with respect to coordinate system 52.

Bi-directional communication with GPS receiver 154 among the other components of system 700 is via local bus 724 and master bus 712. As previously stated, usually only one RTK enabled GPS system is required on vehicle 50. In this case, computer 752 may request GPS data from computer 702. Computer 702 then sends the requested GPS data to computer 752 via bi-directional bus 710. Computer 702 is then acting as a server and computer 752 is acting like a client. Alternately, computer 702 may also send GPS data to computer 752 without a request from computer 752, basically streaming GPS positional and other data to computer 752 as soon as it is received by computer 702 from GPS receiver 154 via local bus 724 and master bus 712.

Imager or camera 252 is a conventional progressive scan CCD camera having a CCD sensor with a rectangular-shaped pixel array usually arranged in a rectangular format for converting light into electrical signals, such as model number RM/TM-6740CL manufactured by JAI Inc. of San Jose, Calif. (United States office). For example, the CCD sensor for the RM/TM-6740CL has an array of 640×480 active pixels.

Attached to camera 252 is conventional lens 260 which may have optical band pass filter 262 (shown in FIG. 6 and which optically passes laser emission wavelength) and further has a manually or electronically adjustable aperture 261 (not shown). Camera 252 also has a programmable electronic shutter 263 which controllably determines the amount of light received by the CCD sensor.

Included within camera 252 is electronic circuitry (not shown) which communicates status, control, and image data using a conventional camera link interface via local bus 266 and master bus 712 to computer 702. Further, camera 252 may be triggered to acquire an image from a trigger signal derived directly from GPS receiver 154 through computer 702 (via an image acquisition system 726) or from other time-deterministic trigger sources (i.e., the time of occurrence of the trigger signal is known).

Linear position (transducer) sensor 110 measures the relative lateral linear displacement of carriage 80 with respect to frame 54 of vehicle 50. For example, linear position sensor 110 may be a conventional industrial digital CANopen draw wire sensor model number WDS-5000-P115 manufactured by Micro-Epsilon of Raleigh, N.C. (United States office) having the sensor housing mounted on frame 54 of vehicle 50 and a flexible steel (Teflon-coated) wire affixed to side frame member 118 at attachment point 114 of carriage 80. Linear sensor 110 may also be a conventional laser range finder affixed to frame 54 and focused on a reflective target mounted on the inside of side frame member 118 of carriage 80, or may be a conventional linear variable differential transformer (LVDT). Position and other data are communicated between sensor 110 and computer 702 via local bus 716, which then becomes a member of master bus 712. Computer 702 may poll (request) sensor 110 for positional information or sensor 110 may continuously send positional data to computer 702. The position of carriage 80 is known via sensor 110 with respect to coordinate system 52 (offset adjusted).

Thus, it is understood that the relative lateral positional movement of carriage 80 with respect to frame 54 is determined by sensor 110, and relative distances moved by carriage 80 can be calculated from differences in position locations, as well as position locations (and distances) of objects mounted on carriage 80, including the positions of paint and bead guns and their respective nozzles, and also relative to coordinate system 52 (offset corrected).

Pressurized air control system 160 (previously referenced with respect to FIG. 4) is in communication with computer 702 via local bus 714 and master bus 712. Lines 216, 236, 238, and 240 are grouped to become local bus 714. Thus computer 702 can control the dispensing of roadway mark material via pressurized air control system 160.

As previously mentioned, motor 414 is a high-torque, low-speed, preferably direct-drive permanent magnet synchronous (PMSM) motor. Having a direct drive motor allows for a simple retrofit installation while maintaining the same lateral movement of carriage 80 for a given manual or motor powered shaft 412 rotation. Direct drive motor 414 also eliminates the need for mechanical gearing. Motor 414 further has a shaft encoder (not shown) for determining the angular position of shaft 412, and therefore the angular position of spline shaft 415. The shaft encoder may be, for example, a conventional optical or magnetic shaft encoder.

Internal to electric motor 414 is programmable motor controller 413 which externally communicates via local communication bus 421 and master bus 712 with computer 702 and may be programmed by computer 702 via signals sent onto bus 421 and master bus 712 to control the rotational position, velocity, or torque of shaft 412 and therefore splined shaft 415 of steering control unit 410. In addition, computer 702 may request and receive data from controller 413 such as motor bus operating voltage, currents, operating temperature, encoder position, and other data.

Computer 702 is a conventional computer having communication ports such as universal serial buses (USB) for communicating with external peripherals such as external memory, memory sticks, and other USB-compatible peripherals. Additional communication ports are provided which may include wired ports, such as Ethernet, EIA-232, EIA-422, EIA-485, etc., and wireless ports such as Wi-Fi, Bluetooth, etc.

Computer 702 also has internally available peripheral component interconnect (PCI) expansion slots and/or peripheral component interconnect express (PCIe) expansion slots. For example, computer 702 may be provided with a conventional PCIe input-output board inserted into a PCIe compatible expansion slot for sending digital control signals from computer 702 to external peripherals, such as conventional roadway mark material pressurized air control system 160, and for receiving digital signals from external peripherals to computer 702.

Computer 702 further includes image acquisition system 726 for interfacing camera 252 with computer 702. Acquisition system 726 may include a conventional frame grabber PCIe expansion slot compatible image frame grabber card such as model number NI PCIe-1433, a high performance camera link frame grabber card manufactured by National Instruments Corporation of Austin, Tex. System 726 also includes a random access memory (RAM) buffer for storing acquired images from camera 252, and handles all of the software overhead (control, image data transfers, etc.) for interfacing camera 252 to computer 702.

Acquisition system 726 further has an external image trigger input 728. In response to an external trigger signal placed onto input 728, acquisition system 726 sends a control signal to camera 252 via busses 712 and 266 to acquire or otherwise "snap" an image at a known time. Image data (pixel grayscale and location values) are then transferred from camera 252 to the on-board buffer memory of acquisition system 726 via the respective busses and then subsequently transferred to data memory 806 (shown in FIG. 10) of computer 702. Acquisition system 726 may also respond to software instructions to acquire image data from camera 252 at known times. Thus image data may be acquired in response to hardware or software initiated trigger signals whose time of occurrence is known.

An external trigger source (not shown) generates and accurately controls the timing of the external trigger signal and may be programmed by computer 702 to produce various trigger signals. For example, the trigger source may be programmed to generate a periodic trigger signal having a known frequency. In response to the periodic trigger signal, camera 252 acquires a sequence of images having accurate and known time intervals between each acquired image. A sequence of images may then be acquired in response to a deterministic external trigger signal. The trigger source may be a conventional programmable signal generator, or may be derived from the computer internal timer, a timing module 730, an external microcontroller based system or GPS receiver 154 (or from the three-GPS receiver/antenna system).

Therefore, it is understood that a sequence of images may be acquired by camera 252 and placed into data memory 806 of computer 702 in response to the occurrence of an externally or internally generated (i.e., by software) deterministic trigger signal, the timing of which may be accurately maintained and controlled by the trigger source or computer 702, respectively. The acquired image is stored in memory 806 as an array of grayscale values having a one-to-one correspondence with the pixel array. For example, a CCD sensor having a 640×480 pixel array will output a 640×480 array of grayscale values (which matches the pixel array). Alternately, a color imager could also be used.

Computer 702 also includes conventional timing module 730 which may be programmed either by computer 702 or from an external programming source via signals placed on line 732 to perform certain timing tasks, and may be used as a trigger source for acquiring images from camera 252 at known times.

Figure 10:
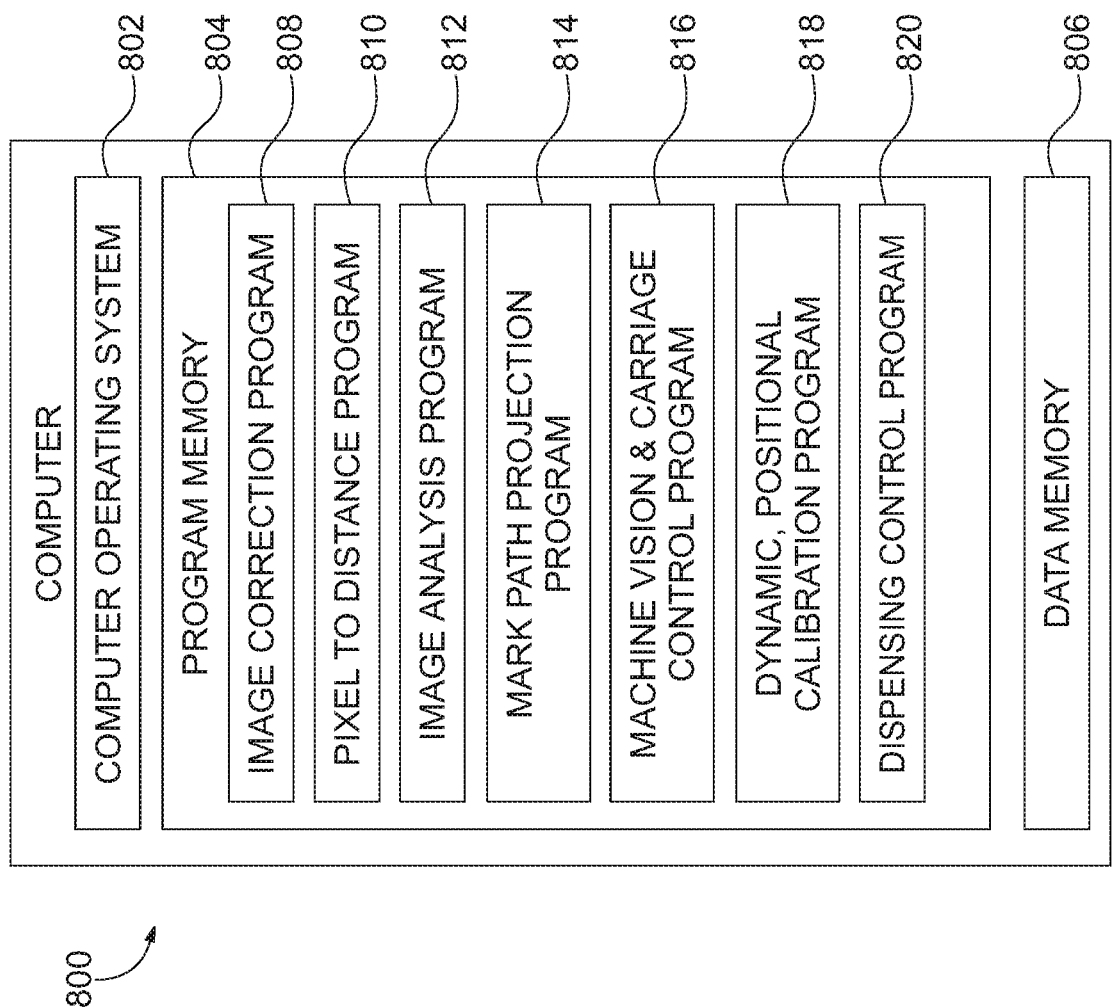
FIG. 10 is a block diagram of the major software elements of the machine vision based control system of the preferred embodiment.

Referring to FIG. 10, a block diagram of memory 800 of computer 702 is shown. Memory 800 includes operating system software 802 for managing hardware and other resources of computer 702, program memory 804 having a number of software programs for performing tasks according to the preferred embodiment of the invention, and data memory 806 for storing system and other data including image data acquired from camera 252.

Operating system software 802 may include a real time operating system (RTOS), UNIX, LINUX, Windows (offered by Microsoft Corporation), or other compatible operating system software, and performs conventional operating system software functions and is capable of executing various programs stored in program memory 804 of computer 702.

Program memory 804 includes an image correction program 808, a pixel-to-distance program 810, an image analysis program 812, a mark path projection program 814, a machine vision carriage control program 816, a dynamic positional calibration program 818, and a dispensing control program 820.

Image correction program 808 inputs raw image data acquired from camera 252 and subsequently corrects the raw image data for optical pin-cushion or barrel distortion produced by lens 260 (and possibly Plexiglas globe 256) and then secondly corrects for perspective distortion using a conventional homography algorithm. Both the raw image and corrected image data are stored in data memory 806.

For example, the object space (i.e., the actual physical field of view of camera 252) of area 70 includes substantially rectangular-shaped roadway mark segment 18, having near longitudinal edge line 40 (i.e., the longitudinal edge line closest to vehicle 50) and far longitudinal edge line 44 (i.e., the longitudinal edge line farthest from vehicle 50), and beginning lateral edge line 42 (i.e., the first lateral edge line approached by vehicle 50) and ending lateral edge line 46 (see FIG. 1). The edge lines form a substantially rectangular-shaped boundary roadway mark segment 18. Lateral edge lines 42 and 46 are commonly referred to as the beginning and ending lines of mark segment 18, respectively. The rectangular-shaped boundary is clearly defined by substantially "straight" lines in object space.

Referring now to FIG. 11A, a distorted raw image 900 of area 70 is shown. The optical and perspective distortions are clearly visible in the raw image of area 70 and, in particular, the partial rectangular-shaped boundary of mark segment 18 of the raw image data is distorted. The original straight edge lines 40, 44, and 42 (only line 42 lies within imaged area 70) of mark segment 18 become distorted line segments (i.e., curved segments) 902, 906, and 904, respectively, in the raw image data 900. Further shown in FIG. 11A are image borders 900a, 900b, 900c, and 900d of the rectangular-shaped image 900 (corresponding to the pixel array data) of the field of view of camera 252.

Referring to FIG. 11B, an undistorted image 914 of area 70 is shown. Image correction program 808 inputs the data of distorted raw image 900 and corrects for both optical and perspective distortions, correcting the distorted image 900 and in particular distorted line segments 902, 904, and 906 into the original undistorted image space line segments 908, 910, and 912 (corresponding to straight lines 40, 42, and 44 respectively), thereby producing undistorted (corrected) image 914. The data representing corrected undistorted image 914 are then stored into data memory 806. Each image (both raw and corrected) is time stamped and stored in data memory 806 along with the respective image.

Also shown in both FIGS. 11A and 11B are conventionally defined pixel (image space) origin 905 and image coordinate axes u and v, which have corresponding object space x-y axes, and an imaged laser line pattern 106a of laser line pattern 106 indicating the lateral position of carriage 80, and therefore the offset corrected lateral positions of the paint and bead guns 84, 86, 88, and 90 and their respective nozzles, with respect to origin 905.

The respective distortion parameters required by image correction program 808 to correct for optical distortion are determined by a conventional optical distortion correction program, such as offered by The MathWorks, Inc. of Natick, Mass., and which is known in the camera calibration art. In addition, perspective distortion is then corrected using a planar homography transformation (it is assumed that the roadway surface 4 is planar within the field of view of camera 252) of the optically undistorted image. Image data of dimensionally defined 2-D checker-board patterns are used by image correction program 808 to determine the corrections necessary to minimize the optical and perspective distortions, along with the appropriate software. Moreover, the image u-v coordinates may extend beyond the actual undistorted image boundaries, again assuming the roadway surface 4 is planar within the field of view of camera 252, and in particular includes the area under the paint and bead guns and their respective nozzles.

Pixel-to-distance transformation program 810 transforms each pixel of the undistorted image into an equivalent object space distance (for example, one pixel in image space in the u-axis direction of the corrected image may correspond to 0.25 inches or 6 mm in object space in the x-direction), or transforms each object space coordinate into a corresponding undistorted image space coordinate. Further, the x-y-z object space location of each pixel is determined and referenced to coordinate system 52 by conventional calibration methods. In particular, pixel-to-distance transformation program 810 may determine the object space x-y-z coordinates of the image space origin 905 of the undistorted image from which all other pixel coordinates in object space may be determined. Data necessary for performing this transformation are again experimentally determined from known object space x-axis and y-axis dimensions of an imaged checkerboard pattern, and determining the z-axis coordinate of the roadway surface 4. Thus, every pixel (in image space) has an equivalent object space x-y-z axis coordinate referenced to coordinate system 52. These pixel-to-object and object-to-pixel distance transformation data are then stored in data memory 806.

Image analysis program 812 determines both the beginning and ending lateral edge lines 42 and 46, and the center points 43 and 47 of the beginning and ending lateral edge lines 42 and 46, respectively, from the undistorted image of roadway mark segment 18 using image processing methods well known in the art. Image processing methods are referenced, for example, in many texts including Rafael C. Gonzalez and Richard E. Woods, *Digital Imaging Processing* (2d ed., Prentice Hall, 2002). Image analysis program 812 also determines the image and object space coordinates of lines 42 and 46 and center points 43 and 47 using data from pixel-to-distance program 810. In addition, program 812 determines the image space coordinates of the imaged laser line pattern 106*a* and determines its corresponding object space x-axis, y-axis, and z-axis coordinates. The results of image analysis program 812 are stored in data memory 806.

Figure 12A:
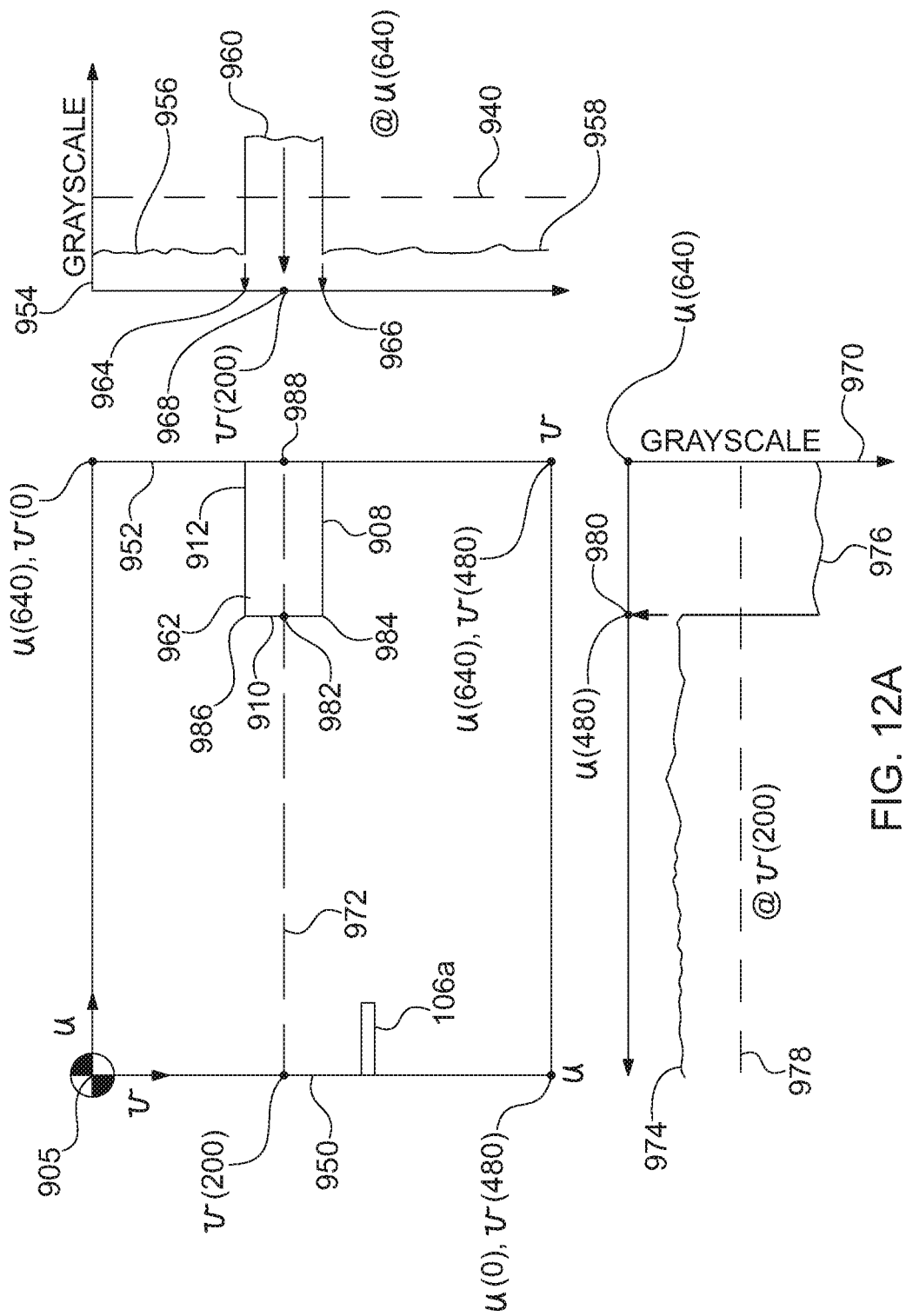
FIG. 12A is a corrected image of an imaged roadway mark showing a pixel grayscale plot along a given u-axis and grayscale plot along a given v-axis.

Referring now to FIG. 12A, the corrected (undistorted) image 950 of area 70 is shown and includes the image space origin 905, which may have an equivalent object space coordinate with respect to coordinate system 52, and the u-v coordinates of the image corners (assuming a 640×480 pixel array). A graph of the image pixel grayscale values along the u(640) defined vertical image line 952 as a function of image coordinate v is shown as graph 954. The graph of the grayscale values indicates low grayscale value regions 956 and 958 on either side of a high value grayscale value region 960. Region 960 corresponds to image 962 of roadway mark segment 18 along vertical image line 952, and is determined by only considering all grayscale values above a threshold value 940. Threshold value 940 can be dynamically set according to the grayscale values of regions 956, 958, and 960 (i.e., dynamically determining threshold value 940 based upon contrast differences between regions 956, 958, and 960) and other parameters. Different threshold-determining techniques are well known in the imaging processing art.

The transition from region 956 through threshold value 940 determines the v-coordinate 964 of the corrected image of undistorted segment 912 of longitudinal edge line 44 and the transition from region 960 through threshold value 940 to region 958 determines the v-coordinate 966 of the corrected image of undistorted segment 908 of longitudinal edge line 40 of roadway mark segment 18. The difference between the v-coordinates 966 and 964 yields the width of the image of roadway mark segment 18 in image space. Therefore, knowing the corresponding image pixel-to-object distance ratio in the v-direction enables determining the actual physical width of mark segment 18 in object space. In addition, the average of the v-coordinate values 966 and 964 yields the v-coordinate value 968 of the center of the image of roadway mark segment 18 (shown for example as v(200)), and hence the location of roadway mark path 16.

It is understood that the image u and v coordinate values in image space have been calibrated to yield equivalent x-y axes object distances, and therefore any pixel u-v coordinates (and pixel derived) distances determined in image space have corresponding x-y-z point coordinates and (and x-y-z derived) distances in object space referenced to coordinate system 52. Also, the exact location of roadway mark segment 18 both in image and object space can be determined.

Also shown in FIG. 12A is graph 970 of the image pixel grayscale values along the v-coordinate value 968 defined horizontal roadway mark path image line 972 as a function of image coordinate u. The graph of the grayscale values indicates a low grayscale value region 974 and a high value grayscale value region 976. Region 976 corresponds to the image of roadway mark segment 18 along roadway mark path image line 972. Also shown in graph 970 is grayscale threshold value 978. A transition from region 976 through threshold value 978 to region 974 defines the u-coordinate value 980 of the image of edge line 42 of roadway mark segment 18. Threshold value 978 can be dynamically set according to the grayscale values of regions 974 and 976 (dynamically determining threshold value 978 based upon contrast differences between regions 974 and 976) and other parameters. Imaged laser line pattern 106*a* of laser line pattern 106 is also shown.

Thus, it is understood that the image u-v coordinates (points 980 and 968, respectively) define the center point 982 of the line image of undistorted segment 910 (and therefore the center point 43 of lateral edge line 42 (i.e., the center of roadway mark segment 18) in object space with respect to coordinate system 52). In addition, the image space coordinates of end points 984 and 986 of the line image of undistorted segment 910 may be similarly determined. For example, the u-v coordinates of end point 986 is u-coordinate 980 and v-coordinate 964. Lateral edge line 42 is commonly referred to as the beginning (or starting) line of roadway mark segment 18. Similar computations may be performed by image analysis program 812 to determine the position of center point 47 of ending lateral line 46, and also the position of lateral line 46 in either object or image space coordinates. Center points 43 and 47 define the longitudinal end points of a substantially straight roadway mark segment 18, but other intermediary points may be used for this purpose as described in reference to FIG. 12C.

Referring to FIG. 12B, a delayed image 990 of area 70 is again shown, but the image of roadway mark segment 18 is now displaced along the u-coordinate axis in the left direction and closer to origin 905 as the result of vehicle 50 moving in longitudinal direction 28 along the roadway mark path 16. The time stamp difference between images 950 and 990 is known. Also shown is imaged laser line pattern 106*a* of laser line pattern 106. An image of laser pointer "spot" could alternately be imaged. The image coordinates of image points 982, 984, and 986 are again determined using the similar technique described in reference to FIG. 12A.

Image analysis program 812 also does computations on both image and object space data and, for example, takes the difference in u-v coordinates, including between points 982 in FIGS. 12A and 12B. This u-v difference is then correlated to object distance using the pixel-to-distance ratio determined by pixel-to-distance program 810. Similar difference and other calculations can be done for the image line segment defined by points 984, 982, and 986, and equivalent image points of imaged line 46.

Image analysis program 812 also inputs pulse count data from drive shaft positional sensor 500 and can perform calculations using these and other data. Image analysis program 812 also may determine if the imaged roadway mark segment 18 comprises a single or double line, a solid or skip line, or any combination and the line patterns using image space calculations and conventional image processing algorithms. The type of line being imaged is location and time tagged and stored in data memory 806.

Referring now to FIG. 12C, a delayed image 992 of area 70 is again shown, but this time the partial image of mark segment 18 is displaced along both the u and v coordinates (the partial image of mark segment 18 is slanted) as the result of vehicle 50 diverging from the roadway mark segment 18 (vehicle 50 is performing a right turn). A slanted image is determined by comparing a previous point 988 (see FIG. 12A) with the current point 994 along vertical image line 952. For example, comparing the v-coordinate of point 988 of FIG. 12A with the v-coordinate of point 994 of FIG. 12C indicates a difference and hence a changing relative distance between vehicle 50 and roadway mark path 16 (and therefore roadway mark segment 18).

For images acquired quickly so that the divergence is not significant between images, the same coordinate-determining techniques to determine beginning and ending edge lines 42 and 46 of the image of roadway mark segment 18 as described for FIGS. 12A and 12B may be used but in this case a new intermediary vertical search line (laterally directed) 952a is used to determine point 996. The u-v coordinates of both points 994 and 996 are now used to define a new slanted roadway mark path image line 972a, and using the techniques described in reference to FIGS. 12A and 12B can then be used to determine center point 982. Also, the points 994 and 996 may be determined (and hence roadway mark path image line 972a) by determining the center of line segment 994a and the center of line segment 996a. Thus, line segments 994a and 996a are longitudinally displaced and laterally directed line segments derived from the intersection of search lines 952 and 952a, respectively, with the roadway mark image, the centers of which define two points on the roadway mark path and can be further used to model the roadway mark path (line 972a assuming a linear model).

Image analysis program 812 also determines the speed of vehicle 50 by determining the u-v coordinate difference between features of successive images of the roadway mark segment 18 (for example the image of the beginning line 42) and converting this difference to object space distance using data from pixel-to-distance program 810, and then taking the difference in time between the successive images. The time each image was acquired and time interval between images are determined by the timing of a trigger signal placed onto trigger input 728, or by other aforementioned deterministic-derived trigger signals previously mentioned (for example, timing signals derived from GPS receiver 154) and are known by image analysis program 812. The speed of vehicle 50 is then determined knowing both the object distance travelled and the amount of time to travel this distance (distance/time). Data from GPS receiver 154 may also be used to determine distances and time intervals, and therefore the speed of vehicle 50.

Image analysis program 812 can also analyze corrected images and determine the gap and mark segment lengths and determine the skip line pattern (for example, a 15/40 pattern).

Mark path projection program 814 computes an equation (mathematical model) which predicts the roadway mark path 16 in image space based upon a sequence of u-v coordinates of individual center points 982 sequentially determined from a sequence of timed corrected images and image analysis program 812. Another available u-v point may be defined at the intersection of border line 952 (u coordinate equals u(640)) and horizontal line 972 (v coordinate equals v(200)) for model development (see FIG. 12A and FIG. 12B). Other image points or image-determined line segments may be used for this purpose such as points 994 and 996 shown in FIG. 12C. In addition, mark path projection program 814 may also determine an equation which predicts the mark path 16 in object space using pixel-to-distance program 810.

For example, two u-v coordinate pairs may be used to develop a straight line mathematical model (a conventional y=mx+b linear equation) of the roadway mark path 16 in either image or object space, and three u-v coordinate pairs may be used to develop a quadratic or other type of interpolated curvature model. This information is then used along with the image space-to-object space conversion values from pixel-to-distance program 810 to develop an object space prediction model of the roadway mark path 16 (the mark path followed by, for example, the center point 43 of edge line 42), and to project the mark path rearward of vehicle 50 especially over carriage 80 and the paint and bead gun area.

Machine vision and carriage control program 816 positions carriage 80 so that paint gun 84 along with its respective nozzle and its associated bead gun 88 are placed over a pre-existing single roadway mark segment 18. It is assumed that paint gun 86 and its bead gun 90 have been laterally adjusted to accommodate a second roadway mark if gun 84 is properly aligned with its respective roadway mark segment 18. Any number of paint and/or bead guns may be accommodated. Machine vision and carriage control program 816 may use either the image or object space roadway mark path 16 mathematical projection model from mark path projection program 814.

Machine vision and carriage control program 816 computes the intersection point of the lateral projection line 81 image space equation and the roadway mark path 16 image space path projection equation. The u-v coordinates of the intersection point define the alignment location of paint gun 84 and its respective nozzle (and bead gun 88) to dispense roadway mark material directly over roadway mark segment 18.

The current position of carriage 80 (and, therefore, the current position of paint gun 84 and its respective nozzle, offset adjusted) may be computed by image analysis program 812 using the u-v coordinates of the corrected imaged laser line pattern 106a of laser line pattern 106. Machine vision and carriage control program 816 then uses the image space intersection point of the lateral projection line 81 image space equation and the roadway mark path 16 image space path projection equation to compute the required u-v coordinate position of the imaged laser line pattern 106a of the projected laser line pattern 106 to laterally position paint gun 84 and its respective nozzle on top of roadway mark path segment 18. Machine vision and carriage control program 816 also corrects for offsets among the paint and bead guns and laser line pattern 106 and other system offsets.

Figure 13:
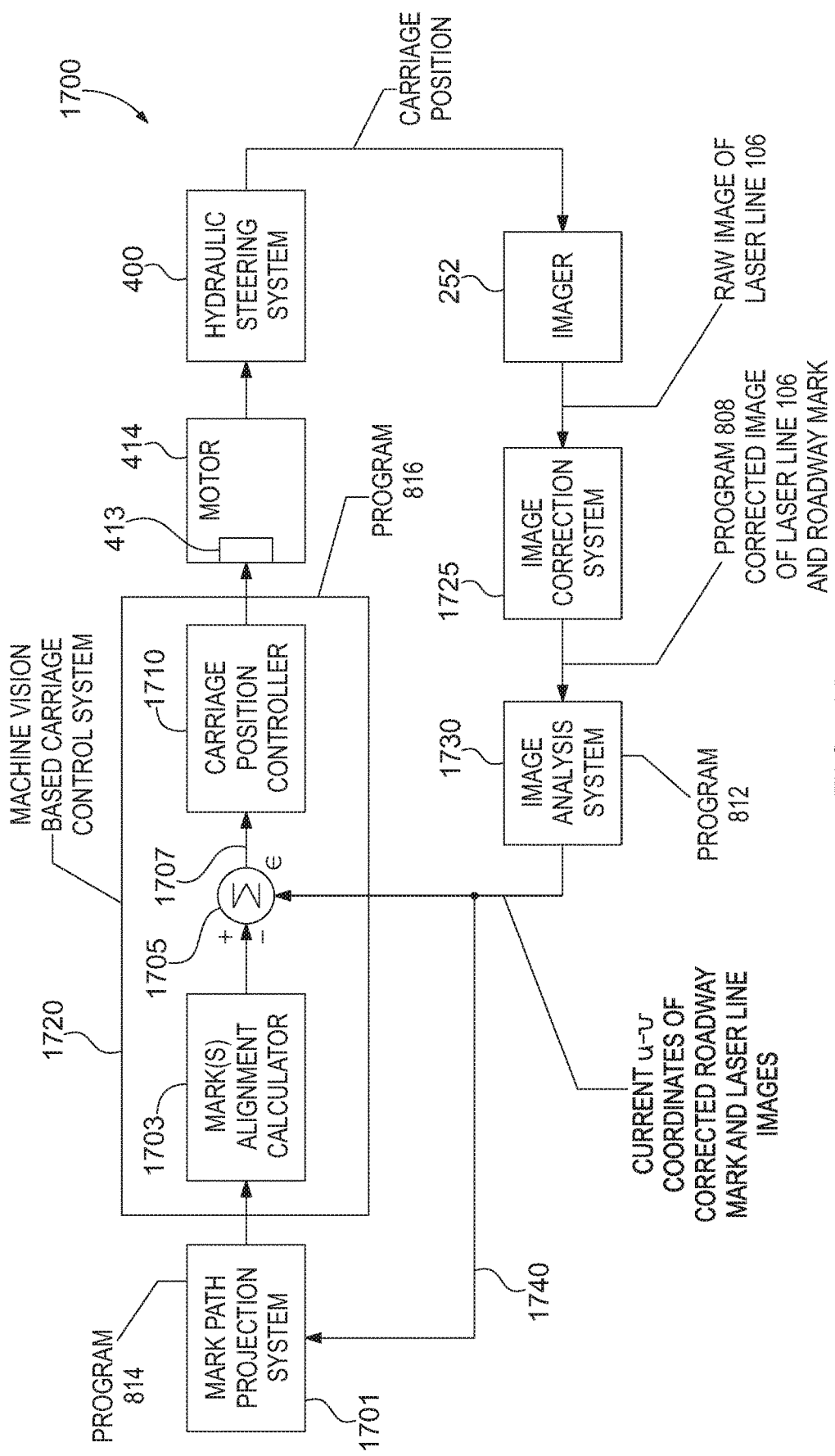
FIG. 13 illustrates a machine vision based control system for aligning the paint and bead guns and their respective nozzles over the center of a roadway mark.

Referring now to FIG. 13, a block diagram of a machine vision based carriage control system 1700 is shown which, in cooperation with programs 808, 812, 814, and 816, commands motor 414 to move carriage 80 via hydraulic steering system 400 in a direction to align gun 84 and its respective nozzle (and bead gun 88) over roadway mark segment 18.

Control system 1700 comprises a mark path projection system 1701 (which may comprise mark path projection program 814), a machine vision based carriage control system 1720 (which may comprise machine vision and carriage control program 816), motor 414, hydraulic steering system 400, camera or imager 252, an image correction system 1725 (which may comprise image correction program 808), and an image analysis system 1730 (which may comprise image analysis program 812). System 1720 further comprises a mark alignment calculator 1703, a comparator 1705, and a carriage position controller 1710. Systems 1701, 1720, 1725, and 1730 may be implemented in software, hardware (such as an FPGA), or a combination of software and hardware.

Mark path projection system 1701 inputs data from image analysis system 1730 via a line 1740 and creates a roadway mark path 16 mathematical projection model in image (and also object) space as previously described with respect to FIGS. 12A, 12B, and 12C. This model is then used by mark alignment calculator 1703 to calculate the intersection point between the lateral projection line 81 image space equation and the roadway mark segment 18 image space path projection equation to predict the image space lateral position of the actual roadway mark segment 18 as it passes under carriage 80 at the position of the paint gun lateral projection line 81 in image space (it is assumed that the image space equation of lateral projection line 81 has been previously determined). This intersection point is the desired lateral position in image space of paint gun 84 and its respective nozzle to dispense the roadway mark material (paint) directly over and onto the pre-existing roadway mark segment 18. The desired lateral position image space coordinate data are then input into the positive (+) input of comparator 1705.

Also from the sequence of corrected images, the u-v coordinates of imaged laser line pattern 106a of laser line pattern 106 are determined by image analysis system 1730, and hence the actual image space coordinates of the paint gun 84 and its respective nozzle are known (offset corrected). These data are then input into the negative (−) input of comparator 1705.

Comparator 1705 takes the difference between the desired lateral position of the paint gun 84 and its respective nozzle to dispense the roadway mark material directly onto the pre-existing roadway mark segment 18 and the actual lateral position of paint gun 84 and its respective nozzle determined by the location of imaged laser line pattern 106a of laser line pattern 106 (offset corrected and determined from imaged area 70 and using image analysis program 812) and generates an error signal 1707. Error signal 1707 is then input into carriage position controller 1710.

Controller 1710 sends motor positional commands (along with angular velocity and acceleration commands) to controller 413 of motor 414. Controller 413 provides smooth coordinated movements with a velocity profile consistent with roadway marking systems. In response to the positional commands received from carriage position controller 1710, motor shaft 412 either rotates or does not rotate. If the error signal 1707 equals zero, motor shaft 412 does not rotate and the hydraulic steering system 400 maintains the current carriage 80 lateral position (and hence the current paint gun 84 and its respective nozzle lateral position). In response to motor shaft 412 rotation, hydraulic steering system 400 either extends or retracts carriage 80 thus changing the lateral position of the paint gun 84 (and also bead gun 88). Changing the lateral position of carriage 80 also laterally moves imaged laser line pattern 106a, and machine vision based carriage control system 1720 moves carriage 80 in a lateral direction which minimizes error signal 1707 thereby aligning paint gun 84 with roadway mark segment 18 as in a conventional classical servo feedback system.

It is therefore understood that the location of carriage 80 is automatically adjusted to correctly position paint gun 84 and its respective nozzle over a projected roadway mark segment 18 using machine vision and image processing technology. It is now necessary to determine when to turn-on and turn-off the paint gun 84 to correctly and accurately duplicate a pre-existing roadway mark segment 18. It is understood that the control of gun 86 is similarly controlled by system 700.

Dynamic positional calibration program 818 dynamically calibrates the pulse-to-distance ratio of drive shaft positional sensor 500 by computing the pixel difference in image space between common features of a roadway mark image, such as center point 982 in FIGS. 12A and 12B, using pixel-to-distance program 810 to compute the equivalent object difference distance, and counting the number of pulses produced by sensor 500 over this interval. A simple division of the object distance and number of pulses yields an accurate distance-to-pulse ratio.

For example, in FIG. 12A center point 982 has coordinates u(480), v(200) and in the successive image of FIG. 12B center point 982 has coordinates u(224), v(200). Taking the distance difference between the image coordinates of FIGS. 12A and 12B yields 256 pixels. If it were previously determined that each pixel represents 0.25 inches (about 6 mm) in object space (using the results of pixel-to-distance program 810), then the total distance travelled equals 64 inches (163 cm) for 256 pixels. If the number of pulses produced by sensor 500 between images 950 and 990 equals 200 pulses, then the distance per pulse equals (64 inches)/(200 pulses)=0.32 inches (8 mm) travelled per pulse. This technique does not rely upon tire diameter or pressure and is therefore more accurate and dynamic than conventional methods, i.e., this technique auto-calibrates with every image taken which has an identifiable feature for each image. A new current distance-per-pulse ratio is therefore calculated continuously with each image and is not a fixed value as currently assumed in the industry. Alternately, the number of pixels per pulse may also be determined 256 pixels/200 pulses=1.28 pixels per pulse.

Dispensing control program 820 controls pressurized control system 160 and determines which solenoid valves to activate and the time duration. Turn-on and turn-off delays of actuating all valves at the same time are also determined.

Figure 14:
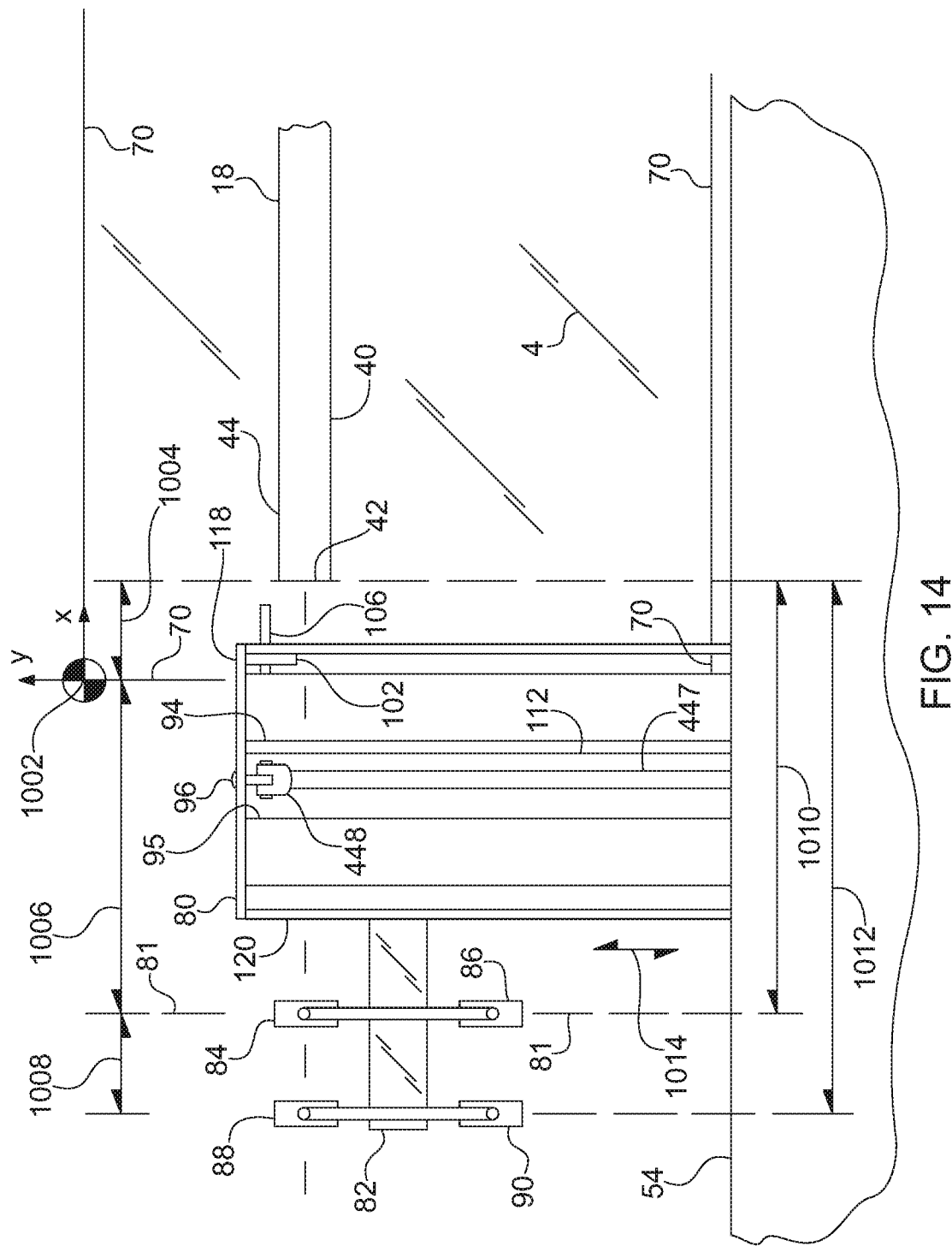
FIG. 14 is an expanded top view of an extended paint carriage and roadway mark showing relative distances between the paint and bead guns, object space origin and the beginning line of a roadway mark.

Referring now to FIG. 14, an enlarged top view of carriage 80 is shown along with gun support 82, paint guns 84 and 86, and their respective bead dispensing guns 88 and 90. None of the hoses or conduits are shown to enhance clarity. Also shown is imaged area 70 having partial roadway mark segment 18 in view. It is assumed that vehicle 50 has moved longitudinally past the former roadway mark segment 13 and is in position to reapply paint and bead to mark segment 18. Note that carriage 80 has been properly positioned (extending or retracting indicated by arrows 1014, or no movement) to align paint gun 84 with mark segment 18 by system 1700, and further assume that mark segment 18 has just been imaged in this current position.

From the image of area 70, the object space location of mark segment 18 beginning line 42 is known relative to the origin 1002 of the object space x-y coordinate system (programs 810 and 812 perform this image space-to-object space transformation), and in particular the longitudinal distance 1004 from line 42 to origin 1002 is determined. The longitudinal distance 1006 from gun 84 to origin 1002 has been previously determined via a calibration procedure, and the distance 1008 has been determined by using a ruler or other calibration methods. Therefore, distances 1010 and 1012 are simply determined by adding distances 1004 and 1006 and adding distances 1004, 1006, and 1008, respectively. The time to turn-on paint gun 84 is when line 42 in under paint gun 84 or, equivalently, when line 42 has travelled a total distance 1010. The travelled distance 1010 is determined by the distance-to-pulse ratio previously determined in dynamic positional calibration program 818 and the subsequent counting of pulses 534 from sensor 500. Similarly, distance 1012 is calculated by counting pulses 534 equivalent to distance 1012. Dispensing control program 820 also takes into consideration the turn-on and turn-off times of the respective guns. Equivalent calculations may be also performed in image space.

Dispensing continues until the number of pulses 534 equals the equivalent distance of roadway mark segment length 24 which has been previously input into computer 702 via keyboard 706 by the operator. Also note that dispensing does not occur for the next mark segment 32 until an accumulated pulse count equal to the distance of roadway mark gap segment length 26 has been obtained. Because the distance-to-pulse ratio is continuously updated and dynamically calculated, accurate maintenance striping of the roadway mark elements occurs without the need for additional carriage operators to force a lead or lag time adjustment during the dispensing cycle.

Although the above discussion refers to a single skip line roadway mark segment 18, similar procedures can be implemented to apply roadway mark material to a double skip line mark, or to single or double solid line mark(s).

For clarity purposes in understanding the operation of the preferred embodiment of the invention, only two images of roadway mark segment 18 will be used as shown in FIGS. 12A and 12B.

Figure 15A:
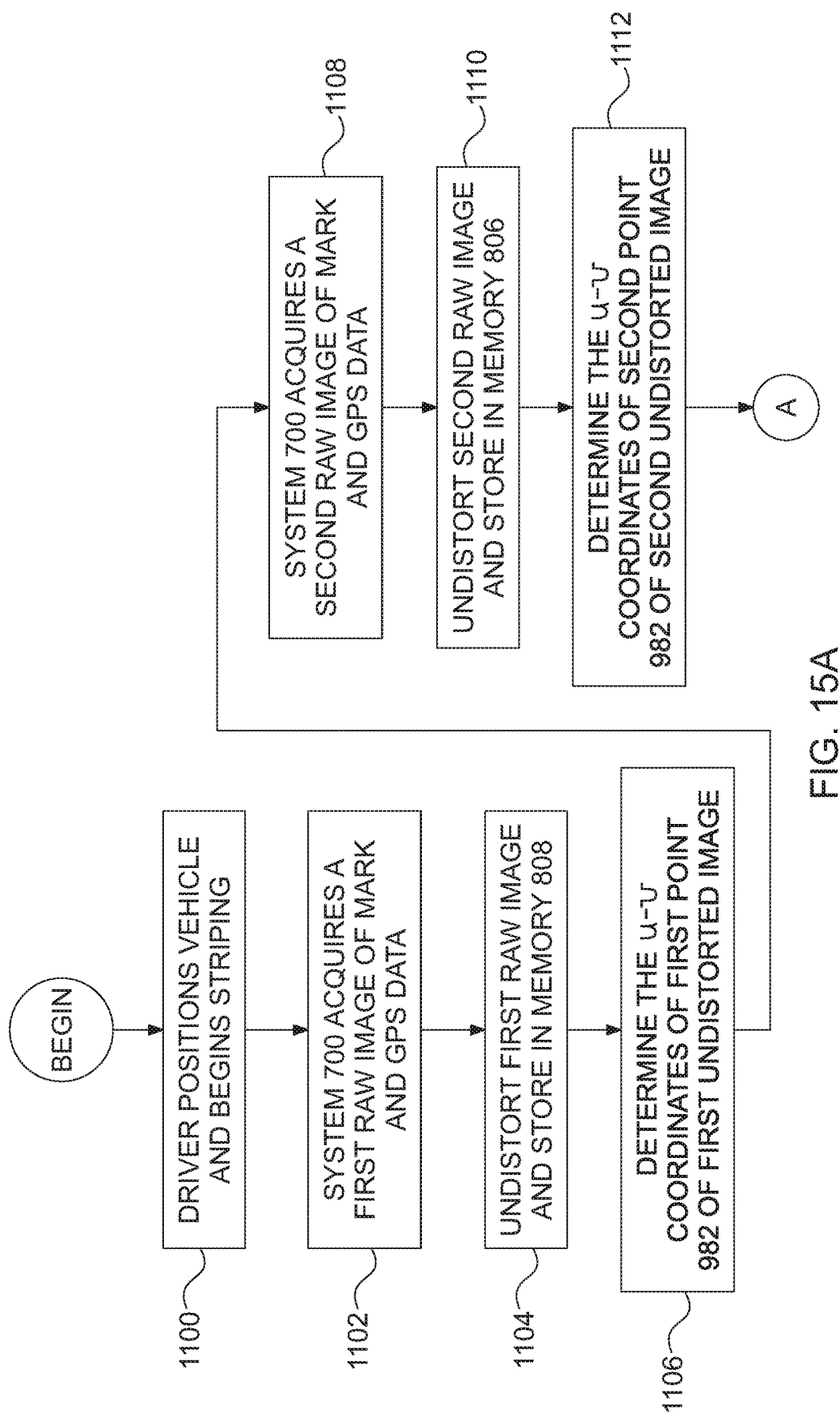
FIG. 15A is a partial operational flow chart of the preferred embodiment of the invention.
Figure 15B:
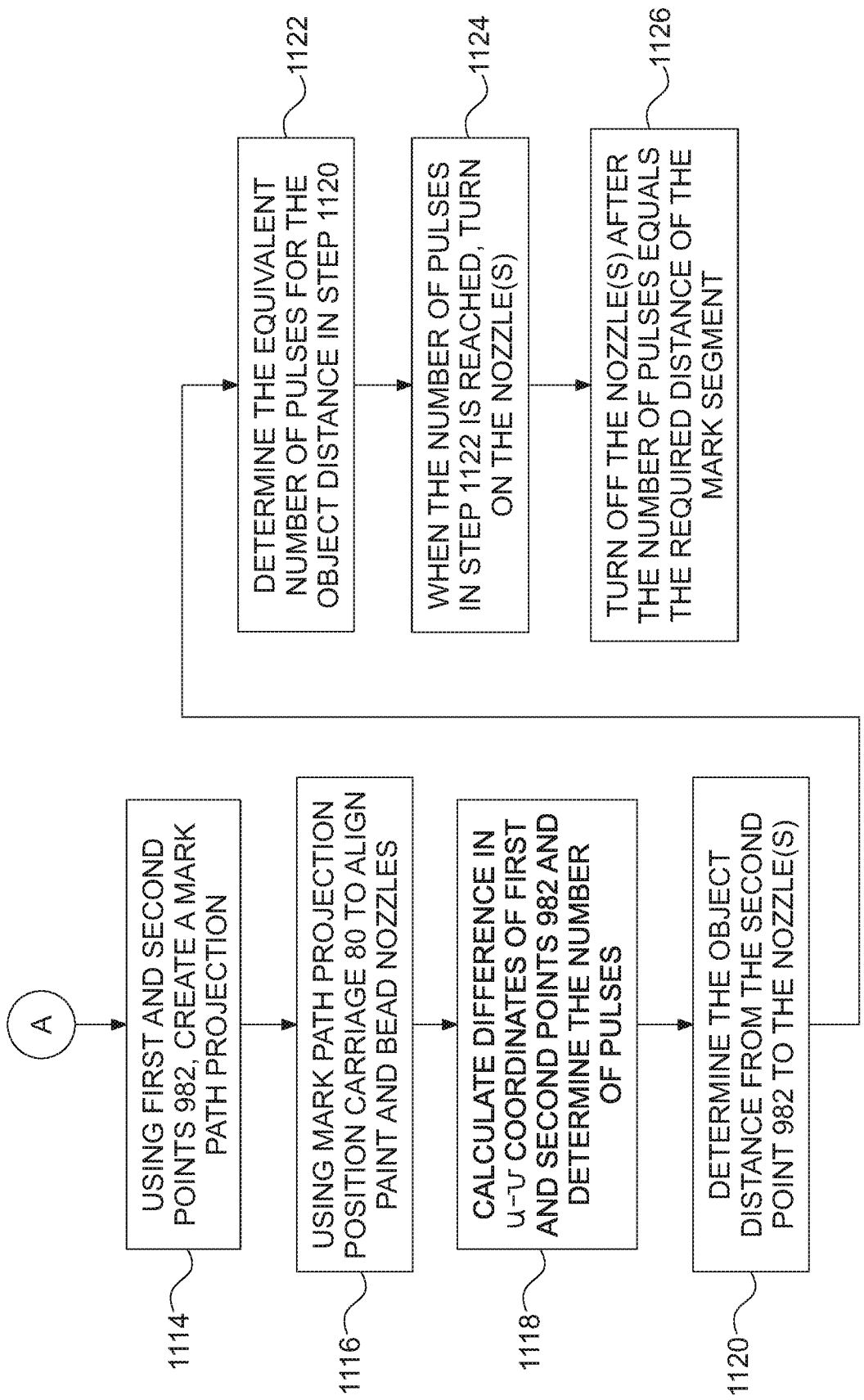
FIG. 15B is a continuation of the operational flow chart of the preferred embodiment of the invention.

In operation and referring additionally to FIG. 15A and FIG. 15B, the process of maintenance striping of pre-existing skip line roadway marks using the preferred embodiment of this invention begins with step 1100.

In step 1100, the operator positions vehicle 50 along a desired roadway mark path 16 having a roadway mark which needs to be restriped with location assistance being supplied by GPS receiver 154 and display LCD 704. It is assumed that all calibration and offset data have been previously obtained and are stored in data memory 806. The driver then inputs the desired line stripe pattern (single or double, solid or skip line(s), for example 15/40) and the type of roadway mark material (paint or paint and bead) to be dispensed using keyboard 706 and depresses the start button on keyboard 706. Alternately, system 700 may determine the line stripe pattern by determining the length 24 of mark segment 18 and length 26 of gap segment 20 using image analysis system 1730. The driver then proceeds to drive vehicle 50 along roadway mark path 16 at a vehicle speed consistent with the type of roadway mark material being used for the restriping process. Continuously updated GPS positional data may be displayed on LCD display 704 (as is currently available in automobiles) to assist the driver in positioning vehicle 50 at the correct starting location and along the roadway mark path 16. Program flow then continues to step 1102.

In step 1102 and in response to the start button being depressed, system 700 (and system 750 if vehicle 50 is so equipped) acquires a first time stamped raw image of the beginning of roadway mark segment 18 (see FIG. 11A) and GPS positional data. Program flow then continues to step 1104.

In step 1104, the first time stamped raw image data are undistorted by image correction system 1725 and the first time stamped undistorted image of roadway mark segment 18 is stored in data memory 806 (See FIG. 12A) along with the time stamp and corresponding GPS positional data. Program flow then continues to step 1106.

In step 1106, the u-v coordinates of a first center point 982 (see FIG. 12A) of the first image is determined by image analysis system 1730. Program flow then continues to step 1108.

In step 1108, system 700 (and system 750 if vehicle 50 is so equipped) acquires a second timed stamped raw image of roadway mark segment 18 (similar to that shown in FIG. 11A) and GPS positional data. This second image occurs after, and is displaced from, the first image because vehicle 50 is moving along the roadway mark path 16 in direction 28. Program flow then continues to step 1110.

In step 1110, the second time stamped raw image data are undistorted by image correction system 1725 and the undistorted image of roadway mark segment 18 is stored in data memory 806 (See FIG. 12B) along with the time stamp and GPS positional data. Program flow then continues to step 1112.

In step 1112, the u-v coordinates of a second center point 982 of the second image are determined by image analysis system 1730. Program flow then continues to step 1114.

In step 1114, a roadway mark path 16 projection equation in image space is calculated using the first and second image center points 982 (in this case the equation will be a line) using mark path projection system 1701. Moreover, the u-v coordinates of the imaged laser line pattern 106a of laser line pattern 106 is determined by image analysis system 1730. Program flow continues to step 1116.

In step 1116 and based upon the mark path projection equation derived from mark path projection system 1701 and the previously stored lateral projection line 81 equation, an intersection point is determined between these two equations in image space using system mark alignment calculator 1703 of machine vision based carriage control system 1720. Carriage 80 is positioned (offset corrected) to align paint gun 84 and its respective nozzle (and therefore also bead gun 88) directly over roadway mark segment 18 using the imaged laser line pattern 106a and carriage control system 1700. Program flow continues to step 1118.

In step 1118, the u-v coordinates of the first center point 982 are subtracted from the u-v coordinates of the second center point 982 and the number of system 500 generated pulses occurring for this difference is determined by image analysis system 1730. Program flow continues to step 1120.

In step 1120, the image space distance from the second center point 982 to the intersection point between the mark path projection equation and the previously stored lateral projection line 81 is calculated by image analysis system 1730. Program flow continues to step 1122.

In step 1122, the number of system generated pulses required to cover the image distance from the last imaged center point 982 to the intersection point along the projected image line of roadway mark path 16 is determined by image analysis system 1730. Program flow continues to step 1124.

In step 1124, when the number of drive shaft positional sensor 500 generated pulses has occurred as determined in step 1122, dispensing control program 820 controls the pressurized air flow via system 160 to gun 84 (and bead gun 88 if required, as previously input by the operator in step 1100). In response to the pressurized air, gun 84 (and bead gun 88 if required) begins dispensing roadway mark material onto, and in alignment with, roadway mark segment 18 until the number of system 500 pulses equals the desired mark segment length in image space as previously input by the operator or driver. Program flow then continues to step 1126.

In step 1126, after the number of system 500 pulses equals the required distance of mark segment 18 having length 24, paint gun 84 is turned off (and also its associated bead gun 88 if previously on) ceasing material dispensing for a number of drive shaft positional sensor 500 pulses equal to the length of the gap segment 20. Another dispensing cycle begins and continues until the desired entire length of center skip line 12 has been restriped.

In operation, the process of maintenance striping of pre-existing solid line roadway marks using the preferred embodiment of this invention is similar to the above steps except that in steps 1106 and 1112 the first and second points used to create a mark path projection line are derived from intermediary points such as points 996 and 994 in FIG. 12C (a solid line is continuous and first and second center points 982 are not discernable). Machine vision based control system 1700 continually updates the lateral position of carriage 80 and therefore paint gun 84 (and its respective nozzle) and bead gun 88 to continuously dispense roadway mark material directly over and onto a solid roadway mark segment. Steps 1118 through 1124 are not implemented and the driver manually terminates the roadway mark dispensing process by depressing the stop key on keyboard 706.

It is therefore understood that a double line, such as the combination of a single skip-line and a solid line, may be restriped according to the teachings of this invention.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges.

We claim:

1. An apparatus for dispensing roadway marking material over a pre-existing roadway mark, the roadway mark previously placed on a roadway surface along a roadway mark path, the apparatus comprising:
    a vehicle for moving along the roadway mark path, the vehicle having a roadway marker adapted to dispense roadway mark material onto the pre-existing roadway mark, the roadway marker responsive to a first signal for dispensing roadway mark material onto the roadway surface;
    an imager affixed to the vehicle for producing an image of the roadway surface including the pre-existing roadway mark;
    a computer responsive to the imager and having a machine vision program configured to:
        recognize the pre-existing roadway mark within the image,
        produce the first signal for dispensing roadway mark material onto the roadway surface over the recognized pre-existing roadway mark, and
        produce an error signal based upon the lateral location difference between the image of the pre-existing roadway mark and the representation of the roadway marker position, and
    an actuator responsive to the error signal for positioning the roadway marker over the pre-existing roadway mark.

2. The apparatus according to claim 1 wherein the roadway marker has an electromagnetic radiation source attached to the marker for producing a mark pattern on the roadway surface which is further imaged by the imager.

3. The apparatus according to claim 1 wherein the imager is adapted to
    image at least two longitudinal displaced and laterally directed line segments of the roadway marker; and
    the computer determine a roadway marker restriping dispensing time from the image of the at least two longitudinally displaced and laterally directed line segments.

4. The apparatus according to claim 1 wherein the actuator comprises
    a laterally moveable carriage to which the roadway marker and imager are attached, and
    a carriage position sensor configured to transmit positional data via wired or wireless communication,
    wherein the computer determines the position of the roadway marker using the positional data.

5. The apparatus according to claim 1 wherein the roadway marker is aligned over the roadway mark in response to the error signal.

6. The apparatus according to claim 1 wherein the actuator further comprises an electrically responsive hydraulic valve controlling a hydraulic steering unit.

7. The apparatus according to claim 2 wherein the electromagnetic radiation source comprises a laser.

8. The apparatus according to claim 2 wherein the electromagnetic radiation source comprises a laser line generator.

9. The apparatus according to claim 3 wherein the computer further comprises a second program adapted to mathematically model the roadway mark path in image space from the center points of the at least two longitudinally displaced and laterally directed line segment images.

10. The apparatus according to claim 1 wherein the imager is downwardly focused.

11. The apparatus according to claim 1 wherein the representation of the roadway marker position is an image representation of the marker position.

12. The apparatus according to claim 1 wherein the representation of the roadway marker position is a lateral distance representation determined by a linear position sensor.

13. The apparatus according to claim 6 wherein the electrically responsive hydraulic valve is connected to an electric motor.

* * * * *